US007806419B1

(12) United States Patent
Howard

(10) Patent No.: US 7,806,419 B1
(45) **Date of Patent: *Oct. 5, 2010**

(54) STEER WHEEL CONTROL SYSTEM WITH RECIPROCATING CYLINDER

(76) Inventor: Durrell U. Howard, 306 Krameria Dr., San Antonio, TX (US) 78213

( * ) Notice: Subject to any disclaimer, the term of this patent is extended or adjusted under 35 U.S.C. 154(b) by 804 days.

This patent is subject to a terminal disclaimer.

(21) Appl. No.: 11/429,480

(22) Filed: May 5, 2006

Related U.S. Application Data

(63) Continuation-in-part of application No. 11/261,986, filed on Oct. 28, 2005, now Pat. No. 7,219,908.

(51) Int. Cl.
*B62D 7/22* (2006.01)

(52) U.S. Cl. ......................... 280/89.11; 74/495; 280/90

(58) Field of Classification Search ............. 280/89.11, 280/89, 89.1, 89.12, 89.13, 90, 93.501, 271, 280/272; 74/495; 180/421
See application file for complete search history.

(56) References Cited

U.S. PATENT DOCUMENTS

| | | | | |
|---|---|---|---|---|
| 2,509,570 | A | 5/1950 | Lee | |
| 2,760,518 | A | 8/1956 | Peet | |
| 3,075,576 | A | 1/1963 | Herbert | |
| 3,169,551 | A | 2/1965 | Lewis | |
| 3,171,298 | A * | 3/1965 | Henry-Biabaud | 74/495 |
| 3,230,975 | A | 1/1966 | Mercier | |
| 3,318,251 | A | 5/1967 | Smith | |
| 3,426,612 | A * | 2/1969 | Henry-Biabaud | 74/495 |
| 3,730,307 | A | 5/1973 | Mitchell | |
| 3,756,367 | A | 9/1973 | Mitchell et al. | |
| 3,792,721 | A | 2/1974 | Zahid | |
| 3,857,413 | A | 12/1974 | Zahid | |
| 3,863,947 | A | 2/1975 | Weston | |
| 3,870,335 | A | 3/1975 | Schultz | |
| 3,882,953 | A | 5/1975 | Maisch | |
| 3,882,954 | A | 5/1975 | Inoue | |
| 3,887,027 | A | 6/1975 | Allison | |
| 3,897,846 | A | 8/1975 | Inoue | |
| 3,958,656 | A | 5/1976 | Niemann | |
| 3,960,179 | A | 6/1976 | Zahid | |
| 3,961,646 | A | 6/1976 | Schon | |
| 4,008,782 | A | 2/1977 | Chanal | |
| 4,088,154 | A | 5/1978 | Patton et al. | |
| 4,349,079 | A | 9/1982 | Leiber | |
| 4,359,123 | A | 11/1982 | Haupt et al. | |
| 4,406,473 | A * | 9/1983 | Sexton | 280/89.11 |
| 4,410,193 | A | 10/1983 | Howard | |
| 4,418,931 | A | 12/1983 | Howard | |
| 4,467,884 | A | 8/1984 | Robertson et al. | |
| 4,503,678 | A | 3/1985 | Wimbush | |
| 4,506,507 | A | 3/1985 | Wimbush | |
| 4,534,577 | A | 8/1985 | Howard | |

(Continued)

*Primary Examiner*—Anne Marie M. Boehler
(74) *Attorney, Agent, or Firm*—Kammer Browning PLLC

(57) ABSTRACT

A steering system control apparatus having a centering unit for resisting off-center movement of the steer wheels of a vehicle and returning them to a selected center position after each such movement. A centering shaft is connected to the steering shaft of a vehicle steering gear for rotational reciprocation therewith and an intermediate rotational position thereof defines a neutral position that is adjustable by a trimming assembly to change a selected center position of the steering system. A holding force and a return force are applied to the centering shaft by actuating members that engage a cylinder arranged for reciprocal movement against a constantly applied resilient force.

21 Claims, 14 Drawing Sheets

U.S. PATENT DOCUMENTS

| | | | | |
|---|---|---|---|---|
| 4,558,878 | A | 12/1985 | Motrenec | |
| 4,566,712 | A | 1/1986 | Motrenec | |
| 4,585,400 | A | 4/1986 | Miller | |
| 4,588,198 | A | 5/1986 | Kanazawa et al. | |
| 4,634,135 | A | 1/1987 | Nakata et al. | |
| 4,638,838 | A | 1/1987 | Richard et al. | |
| 4,669,567 | A | 6/1987 | Nakamura et al. | |
| 4,722,545 | A | 2/1988 | Gretz et al. | |
| 4,828,063 | A | 5/1989 | Ogura | |
| 4,872,486 | A | 10/1989 | Sugimura et al. | |
| 4,903,973 | A | 2/1990 | Bray | |
| 5,076,383 | A | 12/1991 | Inoue et al. | |
| 5,203,421 | A * | 4/1993 | Ueno et al. | 180/417 |
| 5,313,389 | A | 5/1994 | Yasui | |
| 5,527,053 | A * | 6/1996 | Howard | 280/90 |
| 5,536,028 | A | 7/1996 | Howard | |
| 6,267,395 | B1 | 7/2001 | Howard | |
| 6,422,582 | B1 | 7/2002 | Howard | |
| 6,520,519 | B2 | 2/2003 | Howard | |
| 6,520,520 | B2 | 2/2003 | Howard | |
| 6,530,585 | B1 * | 3/2003 | Howard | 280/89.11 |
| 6,817,620 | B1 | 11/2004 | Howard | |
| 6,994,361 | B2 | 2/2006 | Howard | |
| 7,219,908 | B1 * | 5/2007 | Howard | 280/89.11 |

* cited by examiner

STEER WHEEL CONTROL SYSTEM WITH RECIPROCATING CYLINDER

RELATED APPLICATIONS

This application is a continuation-in-part of U.S. patent application Ser. No. 11/261,986 filed Oct. 28, 2005 now U.S. Pat. No. 7,219,908, the entire contents of which are expressly incorporated herein by reference.

FIELD OF THE INVENTION

This invention relates to vehicle steering systems and more particularly to a device for holding the steer wheels of a motor vehicle, such as a motor home, bus, truck, automobile or the like, so that a center steering position is maintained in spite of spurious steering inputs, such as those caused by variable crosswinds, crown curvature or slant of the highway, or other factors tending to adversely affect vehicle steering by the driver.

BACKGROUND OF THE INVENTION

The steering systems of highway motor vehicles and the like are designed primarily for driver control. In these systems, the steering force required on the steering wheel and the ratio between steering wheel movement and movement of the steerable ground wheels (also referred to herein as "steer wheels") depend upon the characteristics of the particular vehicle and the conditions under which it will usually be operated. A wide variety of extraneous forces can act on a vehicle steering system and spurious steering inputs caused by these forces must be dealt with satisfactorily in order to provide stable and controllable steering of a vehicle. As vehicle speed increases, the effects of any spurious steering inputs are magnified, making it necessary for the driver to exercise more precise and careful driving control.

In the past, motor vehicle steering systems have provided some steering wheel returnability by slanting the king pins of the steer wheels so that their top ends are aft of their bottom ends. This is referred to as a positive king pin angle and produces a turning-lift effect that provides some steering wheel returnability as explained further below. The use of positive king pin angles involves compromises over the full steering spectrum because it results in positive caster offset and thereby produces castering of the steer wheels. For example, the adverse effects of strong gusty cross winds are more pronounced with large amounts of positive caster offset. As its name would imply, the vehicle tends to caster towards the side of the roadway to which it is being pushed by the wind. Thus, the adverse steering inputs caused by crosswinds are directly related to the amount of positive king pin angle, which is a classic example of having to balance a benefit with a detriment.

Any small amount of stability gained on a non-windy day from slanting the steer wheel king pins may be paid for many times over when driving in a crosswind because of the destabilizing castering effect of the crosswind. Similarly, a high crown at the center of the roadway or a slanted roadway tends to cause vehicles with castered steer wheels to turn toward the edge of the roadway, that is, in the downhill direction. Castered steer wheels also allow steering inputs from rutted and other imperfect roadway surfaces to steer back against the driver and thereby cause road wander, which is a universal driving complaint, particularly by drivers of heavy vehicles such as trucks and motor homes. In addition, due to increased turning-lift effects, generous positive king pin angles provide significant resistance to small radius turns, which can make city driving quite fatiguing. These adverse effects are some of the negative aspects of attempting to achieve steering system stability through generous amounts of positive king pin angle.

Another drawback of prior art steering systems is that spurious inputs transmitted from the roadway through the steer wheels affect substantially the entire steering assembly before encountering any stabilizing resistance from the steering wheel. The transmission of these inputs between the steer wheels and the steering wheel causes the interconnecting components of the steering system to repeatedly oscillate between states of tension and compression. Such oscillations cause wear and slack in ball joints and other connections and have long been considered a primary source of stress fatigue which can lead to premature failure of various steering system components. Mechanical slack due to worn parts can also be a cause of steering system oscillations and vehicle wandering that require constant corrections and therefore produce driver fatigue.

For lack of a more advanced method, slanting of the steer wheel king pin has been accepted by the industry in the past as a low-cost method of achieving steer wheel returnability. Accordingly, many over-the-road vehicles are provided with generous amounts of positive caster offset. Not much thought has been given by others to the self-defeating side effects of steer wheel castering. Keeping a vehicle tracking straight and under control currently requires an inordinate amount of driver steering corrections to counteract the adverse side effects of castered steer wheels. The repetitive task of making numerous precise steering corrections mile after mile weighs heavily on a driver's physical and mental well-being, and may result in extreme driving fatigue. Thus, a highly important consideration that has long been overlooked by the industry is that steer wheel castering is directly responsible for road wander, crowned road steering wheel pull and cross wind steering problems. The failure of the industry to recognize the critical need to provide directional stability by replacing slanting of the king pins with another method of achieving steer wheel returnability may go down in history as one of the longest enduring vehicle design oversights.

My Precision Steer Wheel Control Technology (PSWCT) has brought to light incorrect technical assumptions that have been responsible for this long-standing major vehicle design oversight, which has in effect been responsible for a lack of heavy vehicle directional stability and related highway safety issues. The heavy vehicle industry has made amazing progress in advancing the state of the art in heavy vehicle design with the exception of recognizing the critical need for directional stability. For over a half a century, the driving of heavy vehicles that are lacking in directional stability has required an inordinate amount of corrective driver steering to keep the vehicle going straight and under control. To be directionally stable, a vehicle's steering system must be designed so that the steer wheels track exceptionally straight without requiring repetitive driver steering corrections to keep the vehicle under directional control, thereby greatly reducing the driver work-load. It has been shown that the industry-wide method of slanting the king pins of the steer wheels to achieve steering wheel returnability is the major cause of the unstable behavior of the steer wheels, which results in driver fatigue and a surprising number of other drivability and operational problems.

While this low-cost simple method of achieving steering wheel returnability is desirable from a manufacturing point of view, the resultant operational problems are very undesirable to the consumers, especially to the heavy vehicle drivers who must endure the million upon millions of miles that are many times more fatiguing to drive than they would be in a directionally stable vehicle that is not adversely affected by crosswinds. Historians will find it hard to rationalize how the hundred-year-old method of achieving steering wheel returnability by the "turning-lift effect" could have been used for so long, without steer wheel castering problems being recognized for their negative effect on heavy vehicle drivability. It was not for the lack of consumer complaints about the repetitive steering corrections required to maintain directional control in spite of road wander and steering wheel pull, about crosswind driving fatigue, and about the cost of accelerated steer wheel tire wear.

In fairness to the presently very capable heavy vehicle design community, the industry-wide endorsement of the long standing heavy vehicle steering and control methodology was established before their time, and had been universally accepted throughout the heavy vehicle industry as a cost-effective method of dealing with heavy vehicle steering requirements. Because the consumers' only choice has been to accept the lack of heavy vehicle directional stability and the related drivability problems as normal, other more pressing problems that the consumers were aware of were given priority over advancing the state of the art in heavy vehicle drivability.

Castering and the turning-lift effect may be further explained as follows with reference to prior art FIGS. 1 to 3. In the beginning when the horseless carriage first took to the road, uncomplicated simple technology was of great importance. As a product improvement, the steering tiller initially was traded for a steering wheel that presented a problem because the steering wheel would stay turned after turning a corner. The lack of steering wheel returnability was solved by the simple method of slanting the pivot axis A1 of a steer wheel king pin 2 aft at the top end to accomplish a turning-lift effect created when the steer wheel 3 was turned to the aft side of the slanted king pin, which moved the turning steer wheel downward by a small amount relative to the vehicle frame as illustrated by broken line 3' in FIG. 1. This downward wheel movement in turn lifted the vehicle frame (not shown) by the same small amount, which is represented by the lift height L1 between the arrows marked "Lift". When the vehicle driver releases the steering wheel after turning, the weight of the vehicle then causes the steer wheel that turned to the aft lower side of the slanted king pin and thereby lifted the vehicle, to return toward the lower most on-center driving position represented by the solid line steer wheel 3.

To better understand the turning-lift effect, a graphic example that almost everyone is familiar with is the post of a farm gate that becomes slanted with the passage of time due to the weight of the gate in its closed position. When the gate 10 is opened in either direction, the low end of the gate is lifted by turning it toward a non-slanting side of the post 9 on a pair of hinges 8,8, creating a turning lift effect as illustrated in prior art FIG. 2 by the broken line 11, which shows a turned position of gate 10, and the lift height L2 between the arrows marked "Lift". When the gate is released, its weight will cause it to swing back toward the lower closed position represented by the solid line gate 10 in FIG. 2. On either side near the gate's closed position, the turning-lift effect diminishes and becomes almost neutral such that its weight alone is not able to hold the gate in the fully closed position, requiring a suitable latch mechanism to keep it fully closed. In a similar manner to the turning lift of the farm gate, when the steer wheels of a vehicle return toward their lowermost on-center, straight ahead position, the turning-lift effect also diminishes and does not have enough centering force to keep the steer wheels tracking straight in the on-center driving position. Therefore, the unstable behavior of the steer wheels near the on-center position requires that they be constantly controlled by corrective driver steering input.

The inherent lack of steer wheel directional stability in the on-center driving position is made worse because the same slanted king pin angle that produces the turning-lift effect also produces a steer wheel castering effect that greatly adds to the unstable behavior of the steer wheels during crosswind and crowned road driving conditions. It is amazing that the adverse effect of steer wheel castering has failed to be better understood over the many years because of an original misleading choice of terms. It can be reasoned that in the beginning the shorter term, caster angle, was probably chosen over the more complex term, turning-lift angle, considering that the angles were one and the same.

For as long as anyone can remember, the standard reference for the required king pin angle in vehicle specification manuals has always been referred to in degrees of caster angle. Therefore, it is not surprising that it has been mistakenly assumed throughout the industry that steer wheel castering in some manner is beneficial to heavy vehicle drivability, when in fact the opposite is true. Accordingly, many of the text books and engineering papers that have been written about heavy vehicle steering geometry have repeated the mistaken assumption that castering the steer wheels makes a contribution to the directional stability of heavy over-the-road vehicles. Unfounded theories, attempting to explain how the castered wheel functions to make a vehicle directionally stable, have been repeated in various technical publications, greatly adding to the confusion.

It is also amazing how anyone whose desk chair has castered wheels, which allow the chair to move freely in any direction, could believe in some manner that, when applied to a highway vehicle, castering would keep the steer wheels tracking straight. Referring now to prior art FIG. 3, a castered wheel assembly 13 simply follows the lateral movement of a forward pivot axis A2 that is offset horizontally from a vertical axis A3 by a caster offset distance 6 between the arrows marked "Caster Offset". Axis A3 defines where a castered wheel 12 contacts the ground G, and arrow D3 indicates the direction of wheel rotation during forward lateral movement of wheel assembly 13. As applied to a highway vehicle, the pivot axis A1 of the slanted king pin 2 slants to intersect the ground G forward of where the steer wheel 3 contacts the surface of the ground as defined by a vertical axis A4. Axis A4 is offset horizontally from the pivot axis A3 by a caster offset distance 5 between the arrows marked "Caster Offset" in FIG. 1. Also in this figure, arrow D1 indicates the direction of wheel rotation during forward movement of steer wheel 3, arrow D2 indicates the direction toward which the wheel axle 7 rotates during a right turning movement of right front wheel 3, and 7', 2', 3' and A1' indicate the moved positions of the wheel axle, the king pin, the steer wheel and the king pin pivot axis, respectively, while the right turn is in progress.

A castered steer wheel therefore does not prevent lateral movement of a vehicle, which instead is actually guided by any force acting on the vehicle to cause lateral movement of the offset pivot axis A1. Therefore, during crosswind driving, the castered wheels of a heavy vehicle are guided down-wind by the lateral down-wind movements of the vehicle in response to crosswind gusts, thereby requiring repetitive driver steering corrections to maintain directional control of the vehicle. Crosswind driving is probably the most exhausting driving experience that heavy vehicle drivers must frequently endure because of the repetitive driver steering corrections required to keep the vehicle under control.

Crosswind driving is therefore one of the major causes of driving fatigue and related heavy vehicle highway safety issues.

Heavy vehicle steer wheel footprint tests have been conducted using highly accurate instrumentation to measure and record steer wheel activity while driving. During the tests, experienced test drivers made a concerted effort to minimize the corrective steering input to only the amount required to maintain directional control. Any test data that was influenced by inadvertent driver over-steer was not used. Most of the test data was recorded at fifty five (55) miles per hour on a non-windy day on a smooth highway. Therefore, the data is considered to represent a best-case scenario.

According to the test data taken at fifty five (55) miles per hour, the left and right driver steering inputs required to correct the unstable behavior of the steer wheels varied from the on-center position thirty-five to forty thousandths (0.035-0.040) of an inch. When the test driver held the steering wheel steady instead of making the left and right steering corrections required to keep the vehicle directionally under control, the vehicle would make an undesired lane change when the steer wheels were off-center by thirty-five thousandths (0.035) of an inch. When the vehicle speed was increased to sixty-five (65) miles per hour, it only required the steer wheels to be directionally off-center fifteen to eighteen (0.015-0.018) thousandths of an inch to make an undesired lane change. During adverse road and wind conditions, the tests also demonstrated that the unstable steer wheel activity increased substantially, requiring a corresponding increase in driver steering inputs to maintain directional control.

The ideal driving situation is therefore one where the steering system inherently causes the vehicle to travel in an unswerving straight line unless the driver intentionally turns the vehicle in another direction. The ideal steering system should therefore require relatively little attention from the driver as the vehicle progresses along a straight line path down the roadway. From a steering standpoint, the vehicle should not respond to anything but the driver's steering commands and these must be of sufficient magnitude to overcome a significant resistance to turning away from center. In the absence of a steering input by the driver, the vehicle should literally do nothing but progress straight ahead.

SUMMARY OF THE INVENTION

The invention provides improved on-center control of the steer wheels, and significantly reduces driver fatigue because it results in a major reduction in driver steering inputs. The invention also eliminates the need for positive caster offset by providing directional stability of steer wheels with no positive caster, i.e., a caster angle of zero degrees (0°). Thus, on-center tracking of the steer wheels is achieved by a means that does not have the deficiencies inherent in positive caster offset and that substantially reduces the need for corrective steering inputs from the vehicle driver.

The positive on-center feel of such a directionally stable vehicle provides a new level of drivability for motor vehicles, including automobiles, trucks, buses, campers and motorized homes. The invention thus achieves new levels of directional stability and drivability, which reduce driver fatigue to a level that cannot be achieved by conventional positive caster centering. When a driver turns the steering wheel of modern over-the-road vehicles, power steering does the work. If these vehicles utilize the present invention and the steering wheel is released, the centering control system goes to work and makes the steered wheels track straight with great accuracy by counteracting spurious steering inputs as described below.

The centering unit section of the centering assembly includes a component that moves with the steering system in response to steering wheel movement, and resistance to movement of this component provides a resistance force opposing very small movements (preferably less than 0.001 inch, more preferably less than 0.0005 inch) of the steer wheels to either side of their center position. Small steer wheel movements in the range of 0.015 to 0.040 inch correspond to the very large radius turns that occur when a vehicle is steered through lane change maneuvers at highway speeds. Thus, during large radius turns, the centering unit provides a centering force that returns the steer wheels back toward their on-center position upon removal of the steering force producing the large radius turn.

The manner in which the present invention accomplishes the foregoing improvements and advantages will now be described. The resistance force is provided by a zero backlash centering assembly that is preferably attached at one end to a fixed frame member and at the other end either to the steering gear pitman arm or to the steering system drag link or tie rod. The assembly comprises a movable centering member in the form of a hollow cylinder arranged for reciprocation within the cylindrical portion of a housing. Although this centering member could also be referred to as a piston, the term "cylinder" is considered to be more appropriate because of the cavity formed by its hollow structure. The centering cylinder is biased by resilient means within its cavity to provide a resistance force for resisting turning movements away from an on-center rest position corresponding to a centered position of the steering system.

In one embodiment, the resilient means comprises a compression spring arranged within the hollow cylinder. In another embodiment, the resilient means comprises a pressurized fluid chamber formed by cooperation between the hollow centering cylinder and the cylindrical portion of the housing, which together define a sealed centering chamber. The cylinder has an on-center rest or "center" position in which an end wall thereof is pressed against opposite pairs of push rollers rotatably mounted on and positioned between the centering arms of a pair of opposing support members, each of which is carried at its center for pivotal movement by a centering shaft that is mounted for rotational movement in response to pivotal movement of a centering lever connected to a vehicle steering system.

The centering shaft via its lever is connected to the conventional Pitman arm or tie rod of the vehicle so as to translate linear tie rod movement into pivotal movement of the centering arms, which in turn cause the push rollers between one pair of centering arms to press against an abutting bearing surface provided by the end wall of the hollow centering cylinder and thereby generate a compressive movement of this cylinder. The sealed centering chamber may be pressurized by either a gas or a liquid, but where a liquid is used, it must be pressurized by an accumulator means with a resilient medium for absorbing and storing kinetic energy, such as a spring or air pressurized hydraulic accumulator. The resilient resistance force provided by the spring force or the fluid pressure resists linear movement of the centering cylinder and turning movement of the usual pair of front steered wheels, which are connected together by a conventional tie rod for steering movements transmitted to the tie rod by the drag link.

When the steered wheels are turned away from center in one direction by the driver rotating the steering wheel in a corresponding direction, the centering cylinder is displaced by the rollers mounted on a corresponding pair of the opposing centering arms, and when the steered wheels are turned away from center in the opposite direction by the driver rotating the steering wheel in the opposite direction, the centering cylinder is displaced by the rollers mounted on the other corresponding pair of opposing centering arms. In either case, when the driver releases the steering wheel, the displaced centering cylinder returns to its on center rest position against the centering rollers of both pairs of centering arms, and this return movement causes the steering system to also return to its on-center position.

As indicated above, the fluid pressure source may utilize either a gas, such as air (pneumatic), or a liquid, such as hydraulic fluid. The fluid pressure of this source, or the spring force a spring means such as a compression spring, is preferably used to maintain a substantial pressure on the centering cylinder at all times during normal operation so that this pressure will cause the bearing surface of the centering cylinder to be firmly pressed continuously and simultaneously against the rollers of both pair of centering arms to keep the steered wheels on center, tracking with an accuracy that is not achieved with any methods other than those of applicant's prior disclosures in this field. The preferred gas pressure source utilizes gas pressure from an existing pressurized gas source, such as an onboard air tank or compressor, a vehicle airbrake system or some other conventional air pressure source. The preferred hydraulic pressure source utilizes a gas over hydraulic pressure accumulator that includes a reservoir for the hydraulic fluid. Gas pressure from a conventional air pressure source, such as mentioned above, may be used to charge a gas pressure chamber on one side of a flexible accumulator wall having a liquid pressure chamber on the opposite side of this wall.

By selecting springs of different sizes or providing different fluid pressures in the centering chamber of the centering unit, the resulting resistance forces applied to the centering rollers by the bearing surface of the centering cylinder may be varied, thereby permitting selection of the resistance to off-center movement of the steering system, as well as the return force for recentering the steering system. The resistance and return forces selected will depend on the particular steering system characteristics of the vehicle on which the steering control system is to be installed. A pressure relief valve may also communicate with a pressurized centering chamber to provide an upper limit to the resistance and return forces that may be generated by contact between the centering cylinder and the respective centering rollers. Although one roller between the respective ends of the support member pairs would suffice, preferably a pair of centering rollers are rotatably mounted on a pin extending between the respective distal ends of the support member pairs.

Because the centering shaft of the centering unit is connected to the steering shaft of a conventional steering gear box, and the centering cylinder is held in its center position by a resilient means, the centering cylinder can not move away from its rest position corresponding to the centered position of the steering system until a steering force exceeds the resilient on-center holding force provided by the spring force of the centering spring or by the fluid pressure in the centering chamber. The level of steering force required to overcome this steer wheel holding force and thereby initiate a steering movement away from center is sometimes referred to in this specification as the "on-center holding force" or "the break-away steering force". Different levels of on-center holding force may be appropriate to compensate for different vehicle weights, different amounts of steer wheel caster, and/or adverse unstable behavior of the steer wheels that the steering geometry does not control or prevent.

When a pressing force applied to the centering cylinder by the centering rollers in response to a steering force is sufficient to overcome the on-center holding force, the centering cylinder moves away from its on-center rest position and, during this compressive movement, it is continuously biased back toward its rest position by centering pressure provided by the resilient means. Thus, a centering force resists relative movement between the movable centering cylinder and the stationary centering housing. This resistance to relative movement between these members prevents any substantial movement of the steer wheels or other steerable member(s) away from their center position until the steering force applied to the steering system by the steering wheel exceeds a predetermined value corresponding to the level of on-center holding force provided by the centering unit. The resilient means also produces a constant contact pressure between the centering cylinder and each centering roller when the components of the centering unit and the steering system are in their on-center positions, thereby preventing any significant slack between these components.

The invention also includes a trim assembly that allows small adjustments to be made in the center position of the steering system to fine tune steering of the vehicle depending on the characteristics of its steering system. For this purpose, a mechanical trimming linkage is provided for a mechanic to change the center position of the steerable members to be maintained by the control system. In particular, the trimming linkage includes a trim rod having oppositely canted threads at each end that are engaged by correspondingly canted threads in sleeve portions of articulated joints at each end. One end of the trim rod is thereby pivotally connected to a component of the steering system, preferably the drag link, and the other end of the trim rod is thereby pivotally connected to the centering lever of the centering unit, the housing of which is fixed to a stationary component of the vehicle frame.

Thus, the trim assembly provides a linkage of adjustable length between the steering system and the vehicle frame on which the centering unit is mounted. The trim rod is rotatable by applying a wrench to one or more pairs of flats on opposite sides of a neck portion intermediate between the rod ends. Thus, the threaded sleeves of the connecting joints may be pulled together or pushed apart (like the ends of two rods connected by a turnbuckle) to change the length of the linkage between the steering system and the frame-mounted centering unit, and thereby the centered position of the steering system and the steered wheels connected thereto.

The trim rod preferably can move the respective joints about one-half inch to about two inches linearly relative to each other. After installation of the centering assembly, the trim rod is rotated precisely by the amount necessary to coincide with the straight ahead direction that the vehicle is to be steered when the steering system is centered. The trim rod is then locked in this position by tightening lock nuts at each end to hold the centering assembly in the on-center position to which it has been trimmed.

The average trim corrections may be on the order of a few one-thousandths of an inch. Such fine tuning of the on-center directional stability makes driving more pleasurable and less fatiguing. The steering control system of the invention thus comprises a centering unit having a center position that is adjustable to permit the on-center position of the steering system to be changed and reset (trimmed) to compensate for any change in the on-center trim condition that would otherwise cause the vehicle to deviate from its straight ahead course.

As an alternative to using a spring means in a vented centering chamber, the centering chamber may be sealed and pressurized by either a gas or a liquid, either of which may be pressurized by an air supply system of the vehicle. In two preferred embodiments shown and described in detail below, the centering chamber is pressurized directly by a gas, such as air. In another embodiment also shown and described in detail below, the sealed and pressurized centering chamber is eliminated in favor of a spring biased centering cylinder having a vent aperture in its end wall to prevent trapping air in the centering chamber, which in this embodiment contains a coiled compression spring.

Regardless of the type of resilient biasing system employed, the system should generate sufficient centering pressure to return the centering cylinder to its rest center position upon cessation of intentional steering inputs. Spurious steering inputs tending to move the tie rod in either direction are therefore resisted by a corresponding on-center holding force generated by either spring or fluid pressure acting against the centering cylinder via its corresponding centering chamber. Only when intentional steering wheel forces exceed a preselected on-center holding force level will the output shaft of the steering gear generate sufficient rotational force on the centering shaft for the push rollers to move the centering cylinder away from its rest, on-center position.

In an embodiment wherein the centering pressure is remotely adjustable, a driver control panel facilitates making centering pressure changes while driving the vehicle. The panel may be conveniently located near the driver and provides at least two basic functions, namely, a switch to turn the system on and off, and a knob or switch for actuating a means for remotely adjusting the pressure applied to the centering cylinder. Activating or adjusting the centering system is therefore an easy and natural driving function. The pressure adjusting means may comprise a gas pressure regulator or a means for changing the spring force applied to centering cylinder, such as a reversible electric motor for adjusting the compression level of a coiled spring.

The control panel may include a gas pressure gauge and a gas pressure regulator connected between the centering pressure chamber and an onboard compressed gas system. This arrangement permits the level of resistance to movement away from center and the level of return force to be controllably varied by hand adjustment of a control knob on the regulator. Thus, the level of resistance to movement away from center may be remotely adjusted by a manual control system operable by the driver. As a further alternative, the regulator control may be driven by a solenoid or reversible electric motor responsive to a microprocessor control system for controlling centering system pressure in response to the output of a vehicle speed sensor. Thus, the on-centering holding force of the present invention may be readily adjustable to provide a low level at lower speeds and a high level at higher speeds, such as above about 35 mph.

The system parameters may be chosen so that a total on-center holding force of at least 100 pounds, preferably at least 200 pounds, and more preferably at least 300 pounds must be applied to the tie rod in order to overcome the on-center holding force at vehicle speeds above about 35 miles per hour. For city driving at vehicle speeds of about 35 miles per hour or less, the on-center holding force of gas pressure systems may be eliminated by turning off the control system or otherwise actuating a gas dump valve at the control panel or, if using the remotely adjustable centering pressure option, the holding force may be lowered to about 100 pounds, more preferably below about 50 pounds, at the tie rod. The centering unit for powered steering systems may be left on continuously because these systems can easily override the on-center holding force. With any malfunction of the vehicle's power steering, an automatic disabling feature may be provided to shut the system completely off.

The centering unit overrides spurious inputs to the steering system of vehicles with positive caster offset so that constant manipulation of the steering wheel by the driver is no longer required to hold the vehicle on a true straight ahead course. When used on steering systems with zero caster offset or with negative caster offset, the invention provides the driver with a positive touch control not heretofore attainable with those types of systems. Positive stability is thereby achieved for otherwise marginally stable or previously unstable steering systems. The invention also provides a distinctive feel when approaching or leaving the center position. Thus, the sense of touch is added to the visual sense to aid control of the vehicle and reduce driver fatigue. The on-center holding force selected should satisfy the road feel desired by the driver and be sufficient to overcome anticipated spurious inputs.

The control system is useable with both power and non-powered steering systems, with the level of centering forces provided usually being less for vehicles without power steering. The invention may be used on steering systems with or without a reduction gear between the steering wheel and the steer wheels. In the former application, the centering unit is preferably connected to the steering system at a location between the steer wheels and the reduction gear so as to be unaffected by any slack in the reduction gear or in components and connections between the reduction gear and the steering wheel. It is therefore preferably installed on the slow side of the reduction gear ratio in order to provide a zero backlash centering unit. The invention is particularly advantageous for large over-the-road motor vehicles, where its use may reduce tire wear by as much as fifty to seventy percent (50-70%) by preventing oscillations of the steer wheels due to steering system geometry and/or driving conditions.

The centering assembly of the control system is preferably connected between the steering system and a nearby frame member of the vehicle in a position that allows the steerable member to move through its full range of steering movements while providing sufficient leverage for the assembly to resist movement of the steerable member away from its centered position producing straight ahead travel of the vehicle. The steering system connection may be made to any steering system component providing appropriate range and leverage, such as the tie rod joining the two front steer wheels of a highway vehicle, the Pitman arm carried by the output shaft of the reduction gear, or the drag link connecting the tie rod to the Pitman arm. In one particularly compact embodiment, the centering shaft of the centering assembly is a special extension of the output shaft of the reduction gear. The frame connection may be made to an axle, a rail, or any other frame component serving as a fixed mounting relative to the movable components of the steering system. This fixed component also may be some other part fixed to the vehicle frame, such as the reduction gear housing, instead of an actual frame member.

Although the present invention is particularly useful as a centering mechanism for the steering systems of motor vehicles, it can be employed to position any steerable member moveable to either side of a preselected position. For example, the control system could keep a boat motor centered so that a boat follows a straight course over the water in the presence of spurious steering forces produced by wind and wave action. The control system can also be used to center such steerable members as the rudders of ships or airplanes and the tongues of tandem trailers or railway cars.

From the consumers' point of view, the present invention, as well as my prior disclosures of Precision Steer Wheel Control Technology (PSWCT), solves a number of over-the-road heavy vehicle operational problems, and the cost of its installation may more than be paid for by the savings in steer wheel tire expense alone because it provides precision steer wheel control that greatly reduces or substantially eliminates excessive steer wheel tire wear. These results are achieved because my PSWCT prevents the steer wheels from castering, thereby alleviating or eliminating the drivability problems that have been caused by steer wheel castering. The system also makes the steer wheels track straight by returning them to and/or holding them in their true centered position, thereby doing away with the unstable behavior of the steer wheels that is inherent to the hundred-year-old farm gate turning-lift technology. The present invention thereby accomplishes one or more of the following improvements in steer wheel control:

(a) advances the state of the art in heavy vehicle directional stability by keeping the steer wheels tracking straight with a high level of precision, greatly reducing the repetitive driver steering input required to maintain directional control, and thereby doing away with long overlooked steering wheel adverse ergonomics problems and making a major reduction in driving fatigue;

(b) achieves relatively easy vehicle controllability during steer wheel tire blowout, and therefore avoids the need for the usual steering wheel fight;

(c) makes a considerable improvement in crosswind drivability by preventing the steer wheels from downwind caster steering in response to wind gusts, thereby making a major reduction in crosswind driving fatigue;

(d) provides heavy vehicle directional stability that greatly reduces the potential for driver over-steer that can easily start an over-steer chain reaction of the type responsible for many loss-of-control highway accidents, and thereby also makes driver training safer and less costly;

(e) significantly reduces or substantially eliminates road wander that is caused by the unstable behavior of the steer wheels that conventional steering geometry does not control or prevent;

(f) does away with steering wheel pull on crowned or slanted roads that is caused by steer wheel caster steering to the low side of the road;

(g) substantially reduces related heavy vehicle accident potential by reducing driving fatigue;

(h) makes team driving safer because the driving is easier and less fatiguing to the on-duty driver and the off-duty driver gets more rest and sleep due to the non-swaying, directionally stable ride;

(i) makes trucks pulling multiple trailers much less fatiguing and safer to drive, and also much easier for other vehicles to share the highway with because the trailers stay in line with the non-swaying, directionally stable truck; and, (j) provides a solution to the costly steer wheel tire wear problem that has long been an added expense to heavy vehicle operators.

The invention thus greatly reduces tire wear of the steer wheels. Tests of my PSWCT suggest improvements in steer wheel tire service life for over-the-road heavy vehicles in the range of about fifty-five percent to about seventy percent. Heavy vehicles using this technology have exhibited a smooth, non-cupping steer wheel tire wear pattern instead of the costly irregular wear pattern of the past. Unlike the puzzling steer wheel tire wear problem that has perplexed the heavy vehicle industry for years on end, the explanation of how my PSWCT solves the problem is uncomplicated and easy to understand. First, the costly irregular tire wear pattern only occurs on the front steer wheels due to the unstable behavior inherent in conventional steering geometry. Second, when this unstable behavior of the steer wheels is prevented by my PSWCT, these wheels are made to track in a directionally stable manner with the same precision as the wheels on the nonsteering rear axles. Therefore, the tires have the same smooth wearing tread and the same normal extended service life as those on the fixed non-steering rear axles.

BRIEF DESCRIPTION OF THE DRAWINGS

The invention, including its structure, assembly and operation, may be further understood by reference to the detailed description below taken in conjunction with the accompanying drawings in which.

DETAILED DESCRIPTION OF THE INVENTION

Figure 1:
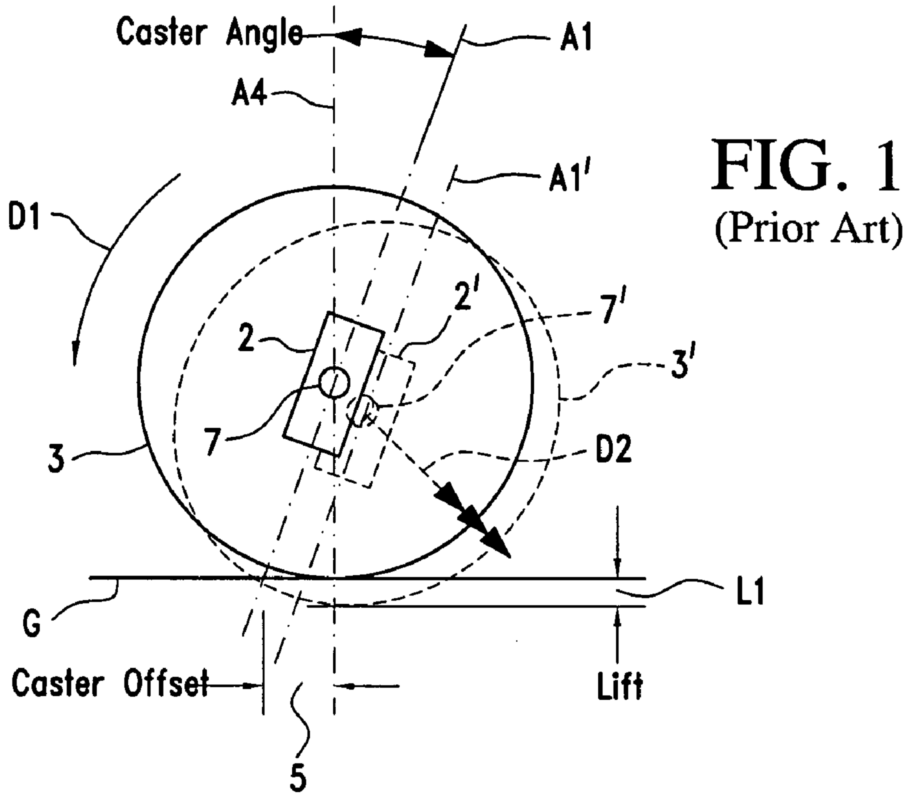
FIG. 1 illustrates the turning of a prior art steer wheel with positive caster.
Figure 2:
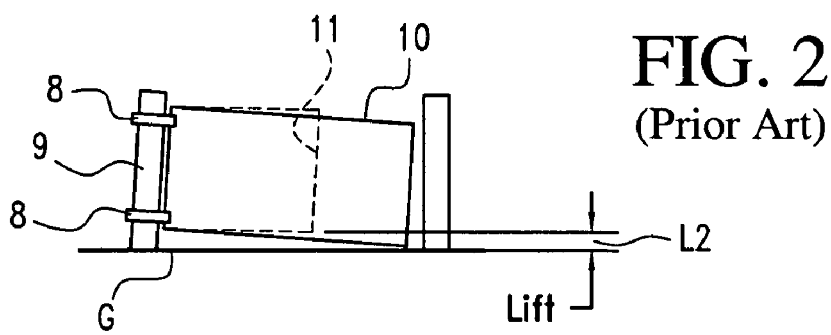
FIG. 2 illustrates the opening of a prior art roadway gate hinged on a slanted post.
Figure 3:
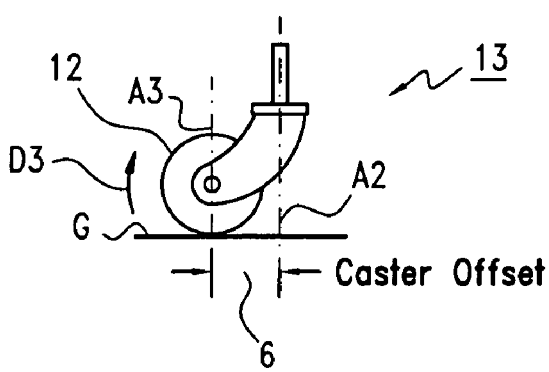
FIG. 3 illustrates a prior art caster wheel.
Figure 4:
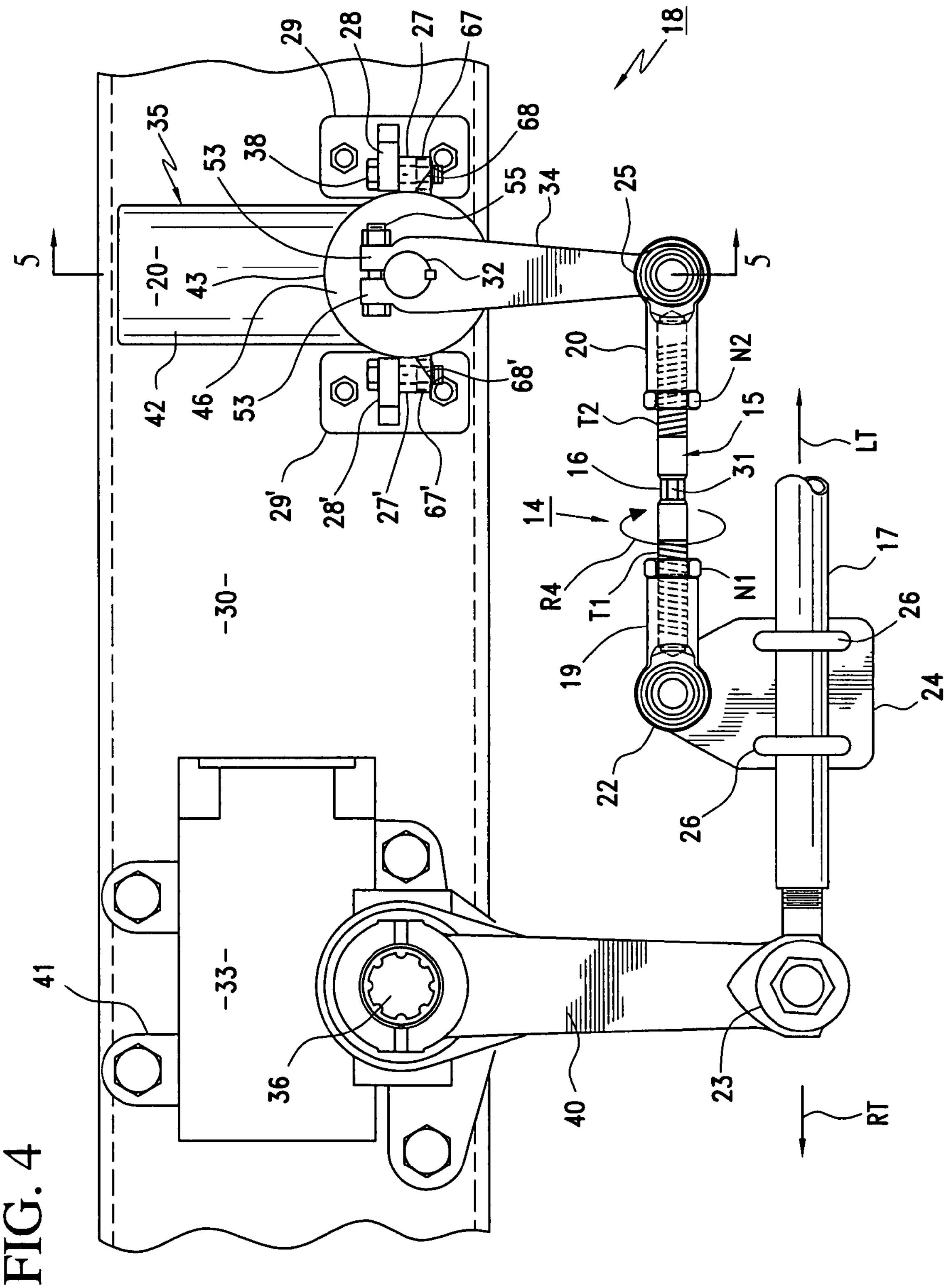
FIG. 4 is a schematic drawing illustrating installation of the centering assembly of the invention between a frame member and steering system components of a motor vehicle.

Referring to FIG. 4 of the drawings, the present invention provides a precision steer wheel control system, generally designated 18, which includes a centering unit 20 and a trimming linkage 14 that form a composite assembly that may be connected between a frame rail 30 and a drag link 17, which in turn is connected to a conventional steering lever or Pitman arm 40 of a motor vehicle by an articulated joint 23. Steering inputs by the driver are transmitted from a steering shaft 36 of a gear box 33 to the vehicle tie rod (not shown) by the drag link 17 via the Pitman arm 40, which pivots in response to rotation of the steering shaft 36 by conventional steering gears within gear box 33. The distal end of a centering lever 34 of centering unit 20 is connected to the drag link 17 by means of the trimming linkage 14, which has a rod 15 connected at one end to lever 34 by a sleeve portion 20 of a ball joint 25 and connected at the other end to drag link 17 by a sleeve portion 19 of a ball joint 22 carried by a plate 24 that is clamped to link 17 by a pair of U-bolts 26,26. The steering gear box 33 and a housing 35 of the centering unit 20 are both mounted on the vehicle frame rail 30 by bolts that pass through housing lugs 41 and bracket base plates 29-29', respectively.

Figure 5:
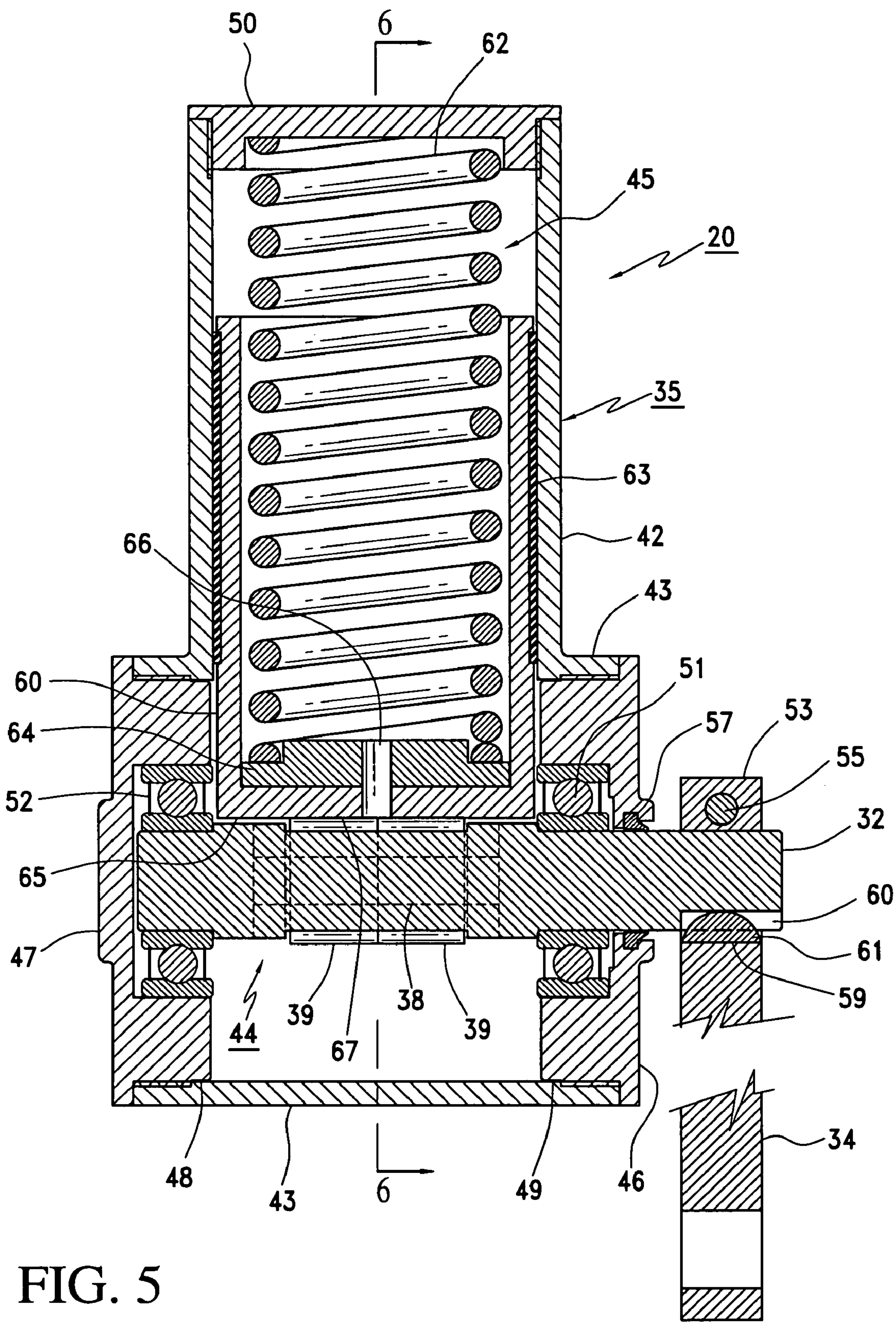
FIG. 5 is an enlarged elevational view of the centering unit in section taken along lines 5-5 of FIG. 4.
Figure 8:
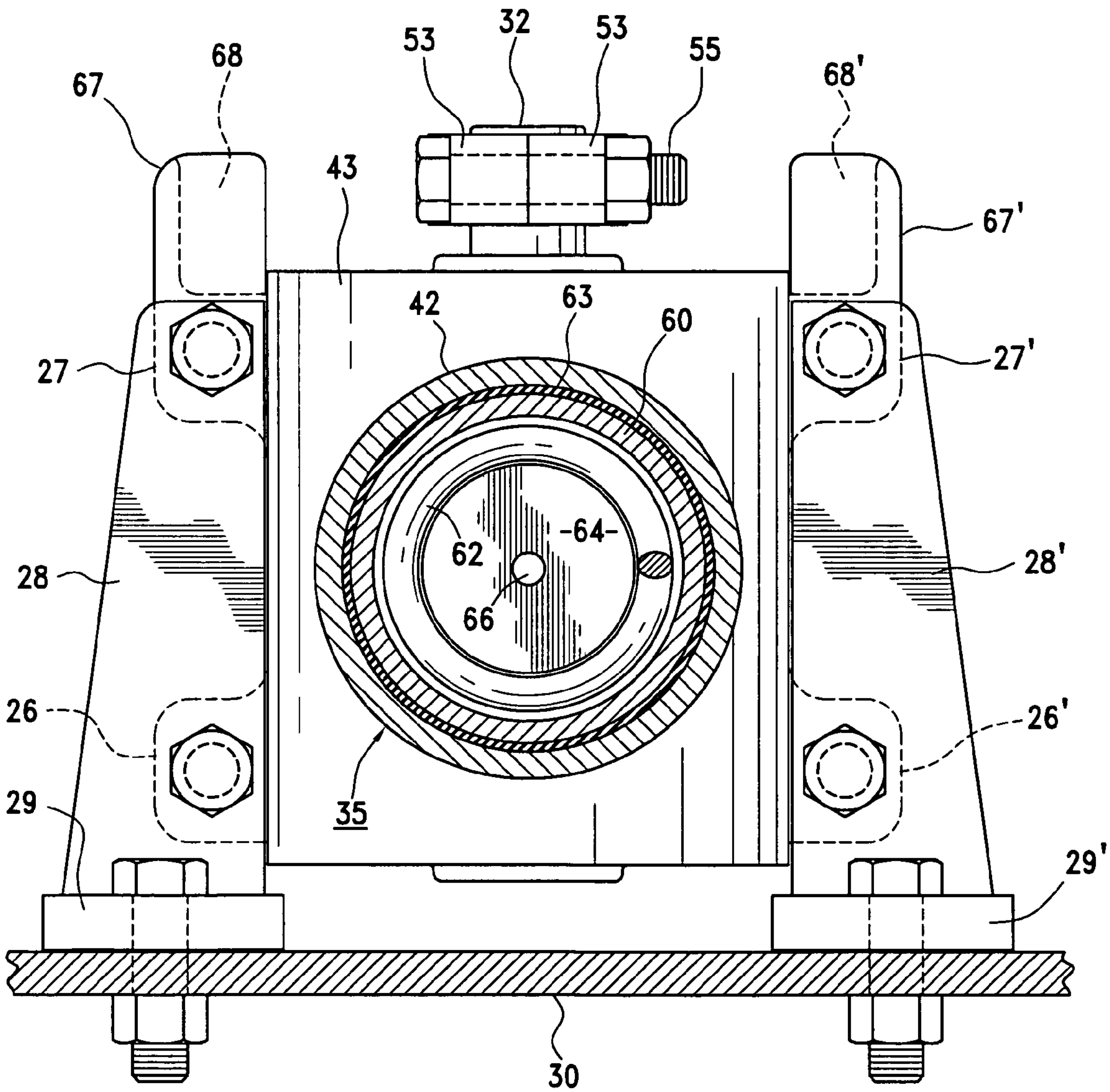
FIG. 8 is a plan sectional view of the centering unit taken along lines 8-8 of FIG. 6.
Figure 9:
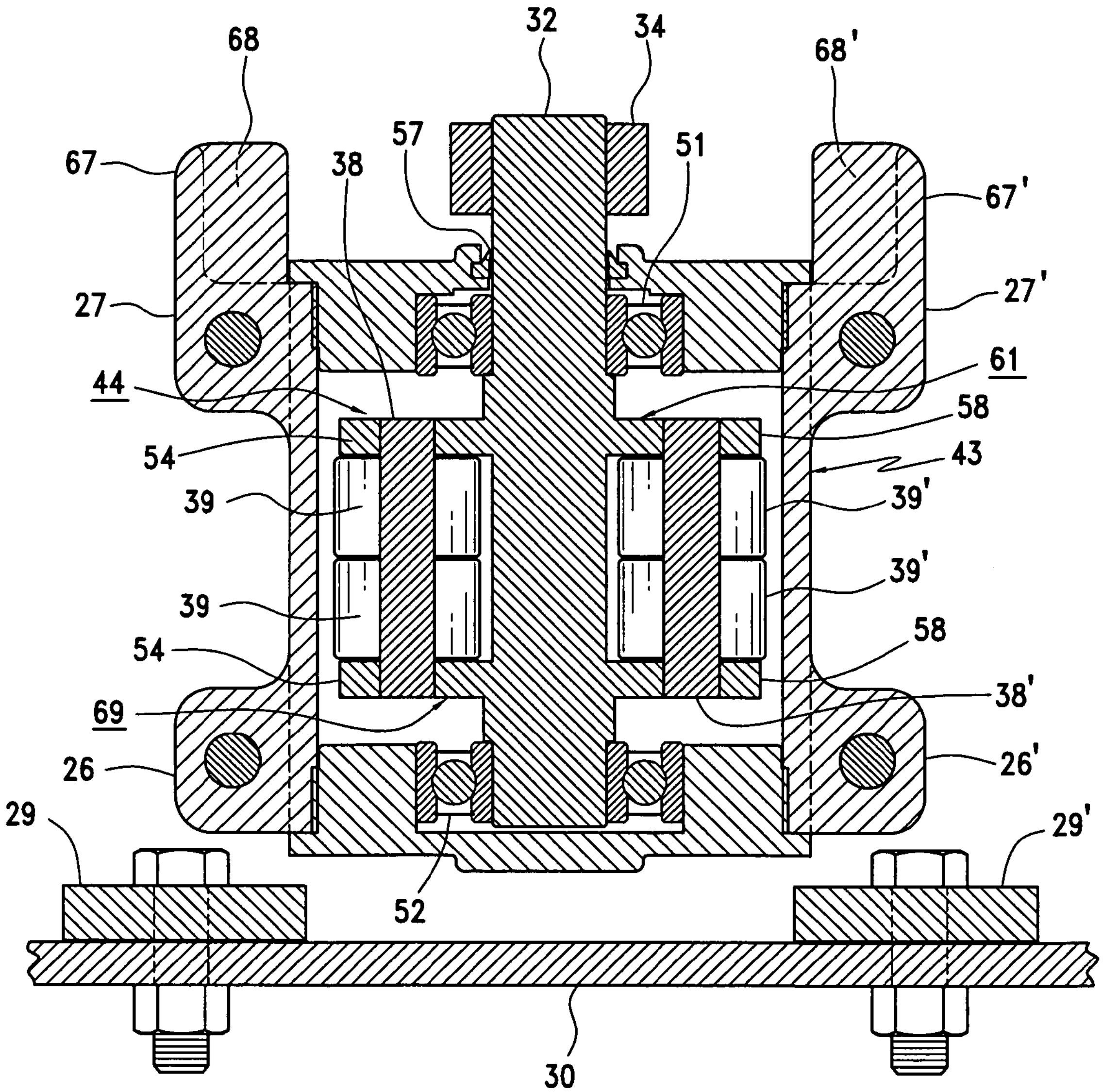
FIG. 9 is a plan sectional view of the centering unit taken along lines 9-9 of FIG. 6.

Centering lever 34 has a proximate end connected to a centering shaft 32 that is mounted for pivotal rotation in a lower barrel-like body section 43 of the centering unit housing 35 by a pair of shaft bearings 51 and 52 (FIG. 5). Bearing 51 is carried by a round disk-like front end cap 46 and bearing 52 is carried by a round disk-like rear end cap 47, caps 46 and 47 being threaded into respective openings of the lower body section 43. A wiper seal 57 is also carried by front cap 46 and sealingly engages the beginning of a distal end portion of shaft 32. Centering lever 34 is secured to the distal end portion of centering shaft 32 for rotation therewith by a clamping portion having opposing ears 53,53 clamped around the distal end portion by a bolt 55 (FIG. 8). A shear key 59 is clamped within and extends between a slot 60 in shaft 32 and a slot 59 in lever 34 to ensure that this shaft and lever rotate together as an integral component.

Figure 11:
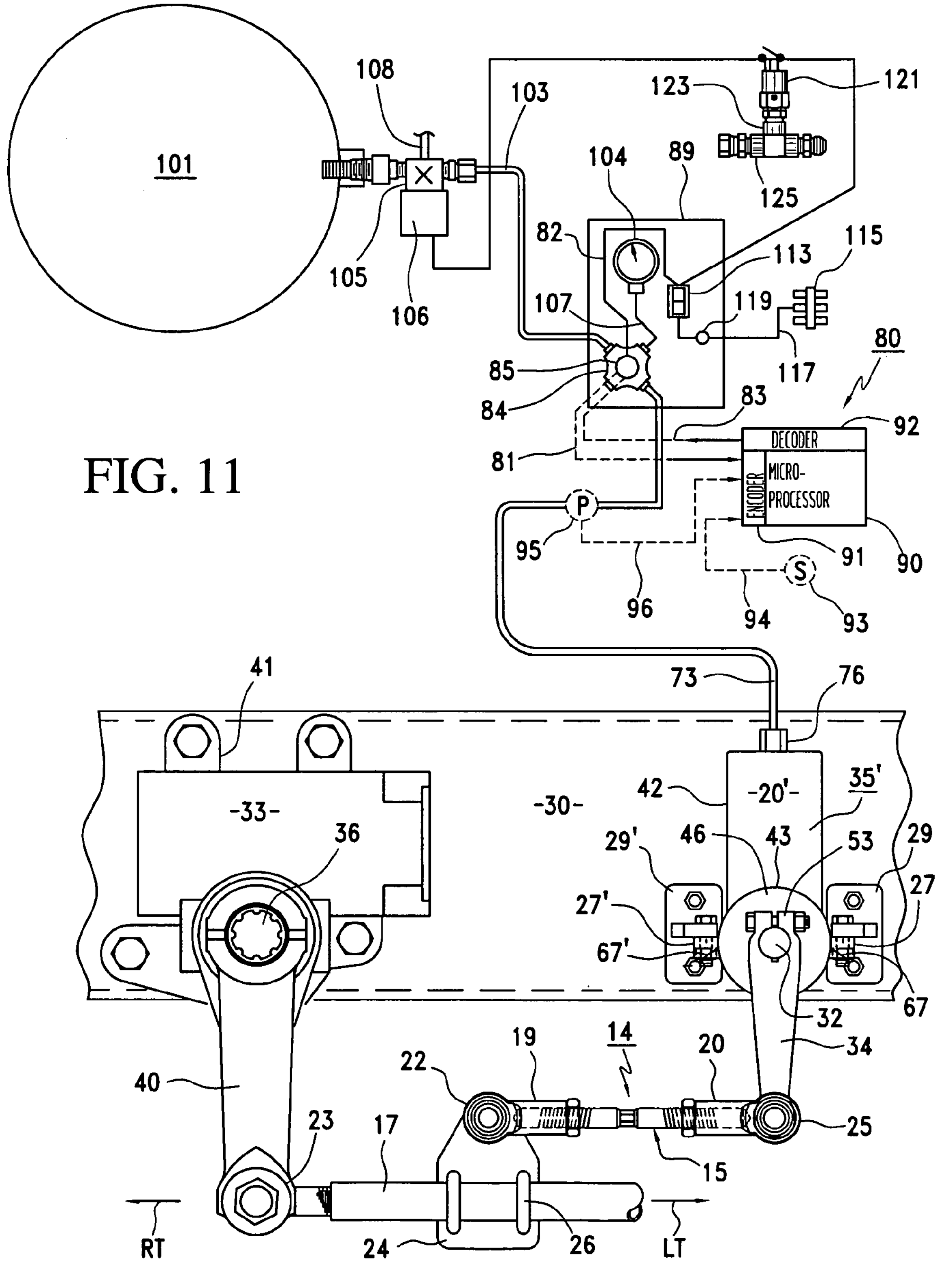
FIG. 11 is a schematic drawing illustrating installation of the modified centering unit of FIG. 10 between a frame member and steering system components of a motor vehicle, and includes a diagram of the fluid and electrical systems of a modified centering assembly of the invention.

As described in detail below, the internal components of the centering unit 20 cause the centering lever 34 to resist pivotal movement of the Pitman arm 40, and thereby resist a turning movement of the steerable wheel(s). The resistance force is provided by resilient means that utilizes the return force of a compressed spring in a vented centering chamber within the centering unit or the fluid pressure supplied through a fluid port leading to a sealed centering chamber within the centering unit. The sealed pressure chamber may be pressurized by a gas, such as air, as shown in FIG. 11, or by a liquid, such as hydraulic fluid from an air-over-liquid accumulator, as shown and described in priority application Ser. No. 11/261,986, which is incorporated herein by reference and is a related application.

Figure 10:
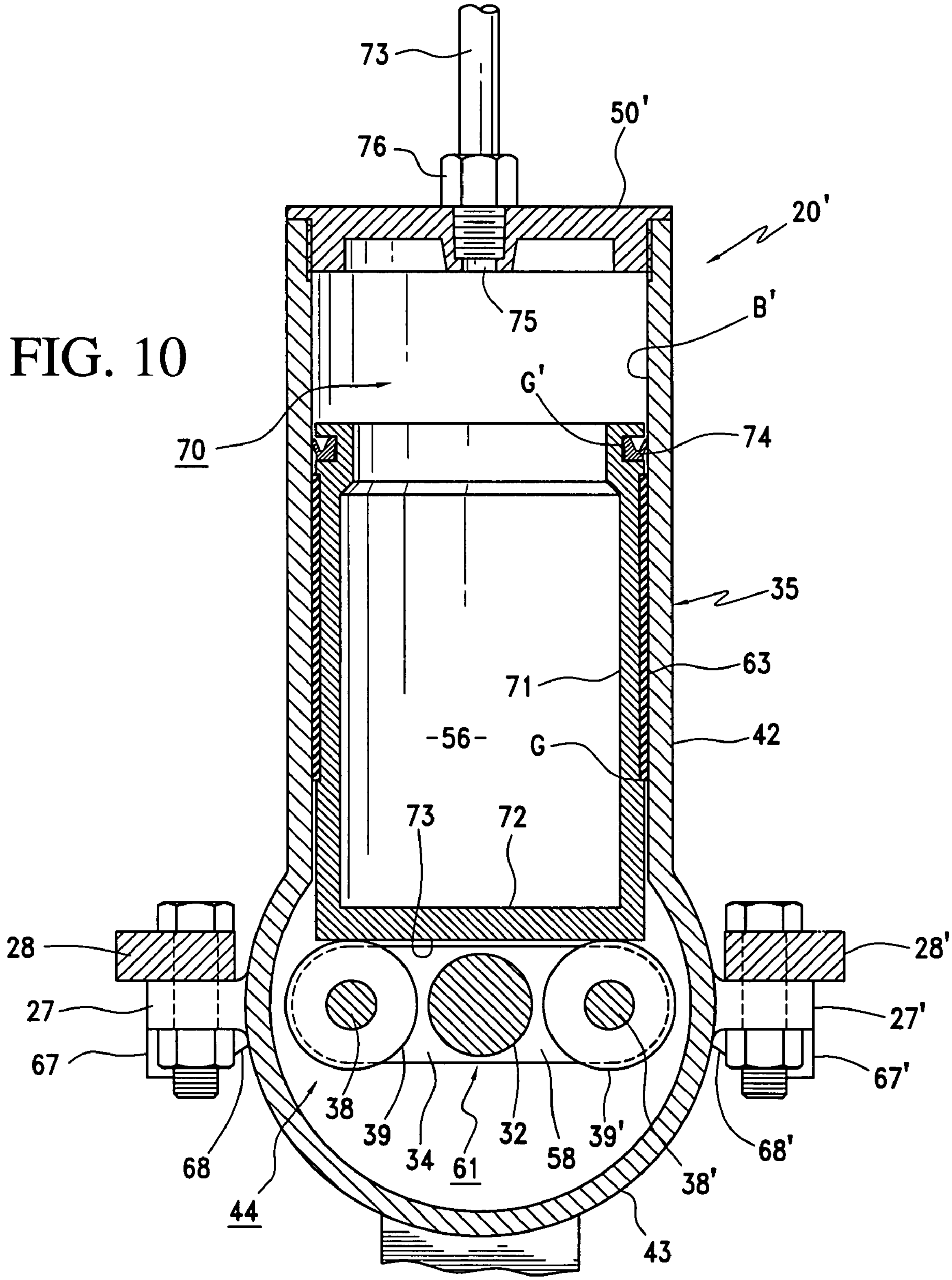
FIG. 10 is an enlarged elevational view of a modified centering unit of the invention and is a sectional view corresponding to the sectional view of FIG. 6.

The major components of the steering control system and the way in which they center and stabilize a vehicle steering system will now be described. The centering unit 20, through the trim linkage 14 and the lever-like Pitman arm 40 and its connecting steering linkages, provides a resistance force as described below for resisting movement of a vehicle's steer wheels (not shown) away from an adjustable center position. The level of this resistance force also may be adjustable if it is dependent upon the amount of fluid pressure supplied to a sealed centering chamber, such as the sealed chamber 70 in the centering unit 20' as shown in FIG. 10. The center position is adjustable because the overall length of the trim linkage 14 may be changed as also described below.

The specific structural arrangement of the components preferably incorporated in or attached directly to the centering unit 20 is shown in FIGS. 4-9. The body of housing 35 of centering unit 20 is preferably made of cast metal, and comprises a cylindrical upper body section 42 and the barrel-like lower body section 43. As may be seen best in FIG. 8, the lower section includes four mounting lugs 26, 27, 26' and 27' for securing the housing 35 to a vehicle frame rail 30 by means of two brackets. One bracket has a base plate 29 bolted to rail 30 and a tongue 28 bolted to lugs 26 and 27, and the other bracket has a base 29' bolted to rail 30 and a tongue 28' bolted to lugs 26' and 27'. The lug 27 includes a projecting stop 67 and the lug 27' includes a projecting stop 67' for limiting the range of pivotal movement of centering lever 34, and thereby limiting the amount by which the steerable wheel(s) may be moved away from their centered position. The stops 67 and 67' have respective canted surfaces 68 and 68' that provide flat contact surfaces for engaging the respective edges of lever 34.

Arranged for reciprocation within a bore B in the upper housing section 42 is a hollow centering cylinder 60 that is guided by a bushing 63 of low friction material, such as Teflon, and is biased downward by a coiled compression spring 62 compressed between a top cap 50 and a spring seat 64 resting on an end wall 65 of cylinder 60. Although the bushing 63 could be mounted in a recess of the housing 35, it is preferably mounted in a peripheral recess or groove G in the exterior surface of the sidewall of cylinder 60 so as to be carried thereby. The upper portion of bore B and the cavity 37 of cylinder 60 together form a centering chamber 45 that is vented by a breathing port 66 passing through seat 64 and cylinder end wall 65, which has an outer bearing surface 67. The cylinder 60 is preferably cylindrical, as is the bore B and the upper house section 42, although these components may have other cross-sectional shapes.

Figure 6:
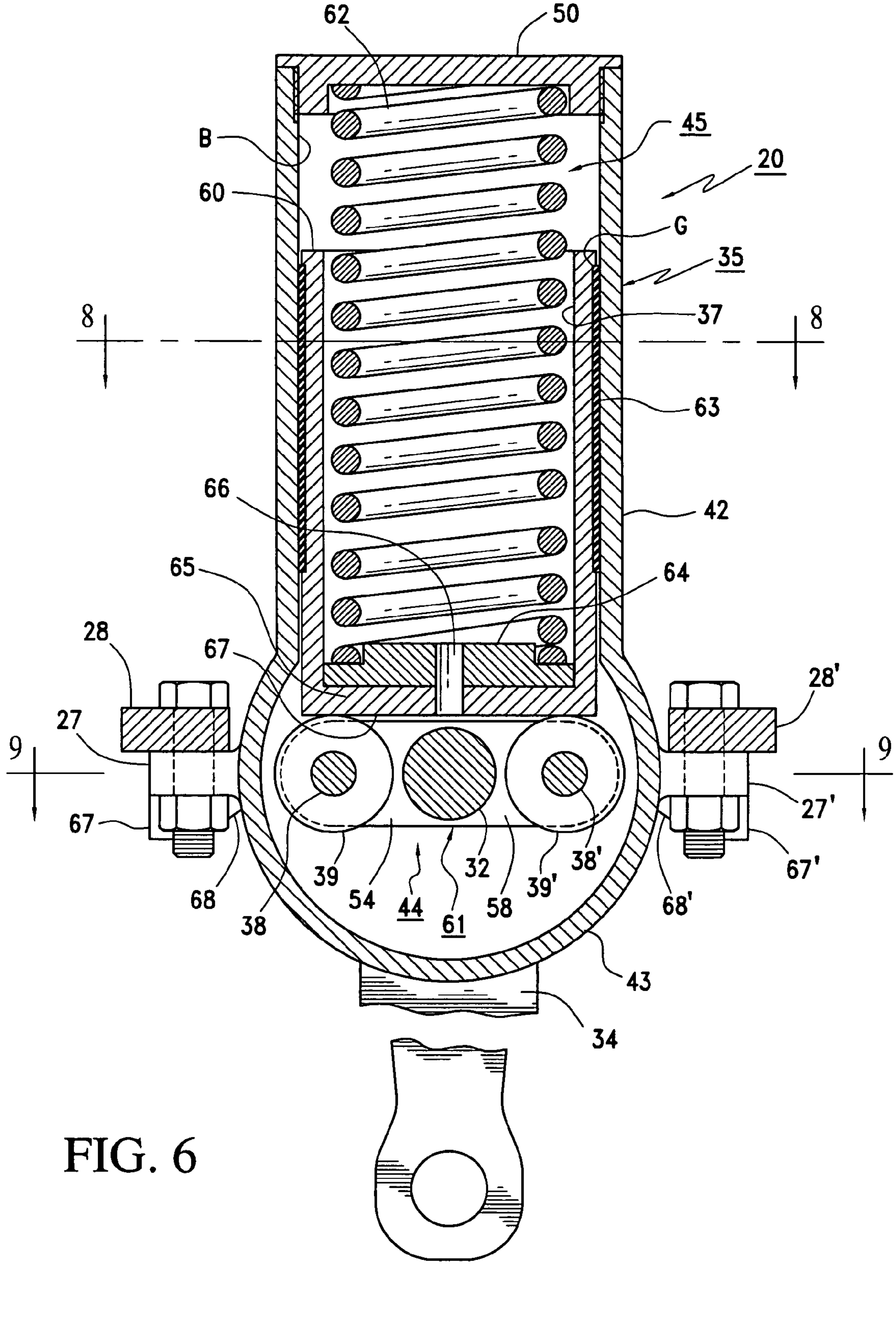
FIG. 6 is an enlarged elevational view of the centering unit in section taken along lines 6-6 of FIG. 5.

The reciprocation of cylinder 60 is driven against the resilient spring force of spring 62 by a push mechanism, generally designated 44, having a plurality of roller bearings mounted for rotation on a plurality of support arms provided by two opposing support members 61 and 69. The support members 61 and 69 are affixed to centering shaft 32 for pivotable movement therewith as shaft 32 is pivoted by centering lever 34, which in turn pivots along with the Pitman arm 40 via the linkage provided by trimming linkage 14. As may be seen best in FIG. 9, the support members 61 and 69 comprise two pairs of opposing support arms 54,54 and 58,58, arms 54,54 carrying a pin 38 on which are rotatably mounted a pair of roller bearings 39,39, and arms 58,58 carrying a pin 38' on which are rotatably mounted a pair of roller bearings 39',39'. As shown in FIG. 6, in the absence of any turning movement, the pressure of spring 62 against cylinder end wall 65 causes both pairs of roller bearings to be continuously and firmly pressed against the bearing surface or raceway 67 along the outer surface of end wall 65. The resulting at rest pressing force prevents any mechanical slack in the centering system.

Figure 7:
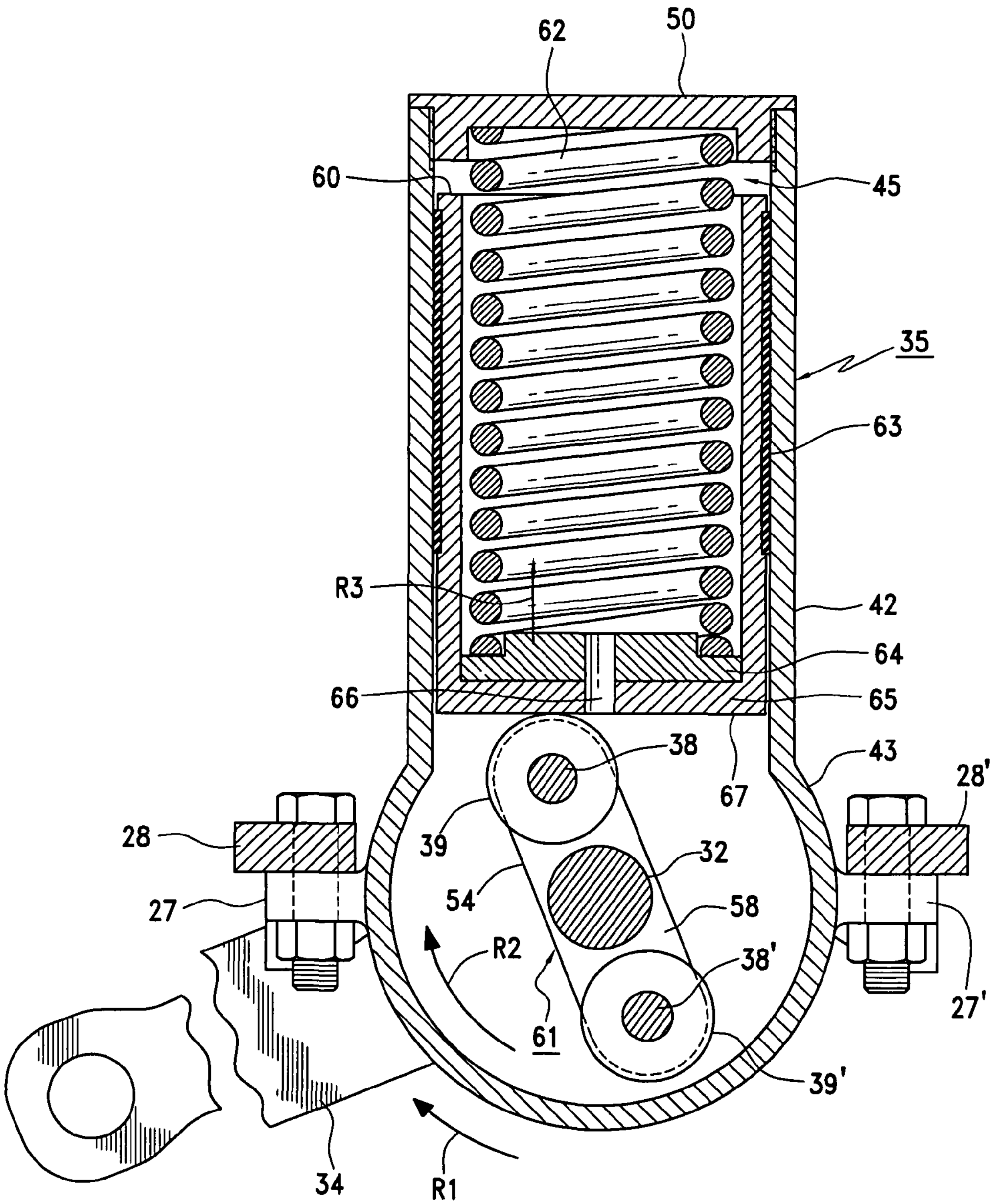
FIG. 7 is an enlarged elevational view of the centering unit in section similar to FIG. 6, but showing the components thereof in a moved position corresponding to a vehicle turning movement.

Referring now to FIG. 7, as centering lever 34 tends to pivot in the direction R1, the push mechanism 44 tends to pivot in the direction R2 causing the bearing rollers 39,39 to press harder than bearing rollers 39',39' against the bearing surface 67 along the bottom wall 67 of cylinder 60. When the pressing force provided by rollers 39,39 is sufficient to overcome a resistance force provided by the pressure of resilient spring 62 in centering chamber 45, cylinder 60 travels through a compressive movement in the direction of arrow R3, centering lever 34 pivots in the direction R1, and centering shaft 32 and push mechanism 44 pivot together in the direction R2. The directions R1, R2 and R3 in FIG. 7 illustrate a turning of the front steer wheels of a motor vehicle toward the left side of the vehicle for making a sharp left turn, as illustrated by the arrow LT in FIG. 4. Similarly, for a right turn of the vehicle as illustrated by the arrow RT, the pivotal movement of centering lever 34, centering shaft 32 and push mechanism 44 will be in the directions opposite to arrows R1 and R2 in FIG. 7, such that roller bearings 39',39' will provide the necessary pressing force for causing cylinder 60 to have a compressive movement in the direct R3.

The centered steering position to be maintained by the centering unit 20 described above may be changed as follows by the trim linkage 14 shown in FIG. 4. The length of linkage 14 is changed by loosening the lock nuts N1 and N2 and then rotating the trim rod 15 in the appropriate direction either to pull the joints 22 and 25 closer together if the centered position of the steering system needs adjustment toward the left side of the vehicle, or to push the joints 22 and 25 further apart if the centered position needs adjustment toward the right side of the vehicle.

The rod 15 may be rotated by applying a wrench to flat surfaces 31 that are located on opposite sides of a neck position 16 of smaller diameter intermediate between the threaded ends T1 and T2 of the rod. The cant of threads on end T1 and in sleeve 19 are opposite to the cant of threads on end T2 and in sleeve 20 such that the rod 15 and respective sleeves 19 and 20 operate in the same manner as a turnbuckle. Thus, with the threads canted as shown in FIG. 4, rotation of the rod 15 in the direction of arrow R4 will push joints 22 and 25 further apart, causing joint 22 to move in the direction RT for a centered position correction toward the right side of the vehicle. Upon completion of the desired adjustment (preferably performed by a mechanic), the lock nuts N1 and N2 are retightened to prevent any accidental or other undesirable rotation of rod 15 and thereby secure the steering system in its new on-center position.

Referring now to FIGS. 10 and 11, there is shown a modified embodiment 20' in which the resilient means is a pressurized gas in a sealed centering chamber 70, instead of the resilient compression spring 62 of FIGS. 4-9. Chamber 70 is sealed to retain gas pressure by providing a hollow cylinder 71 with a closed lower end 72 and a U-cup circumferential gas seal 74 around the upper portion of cylinder 71. Although the seal 74 could be mounted in a groove of the housing 35, it is preferably mounted in a peripheral recess or groove G' in the exterior surface of the sidewall of the cylinder 71 so as to be carried thereby.

In this embodiment, the centering chamber 70 is formed by the upper portion of a housing bore B' and the cavity 56 of cylinder 71. A pressurized gas, such as air or nitrogen, is supplied to chamber 70 via a gas conduit 73 connected to a top cap 50' by a fitting 76 threaded within an aperture 75 through cap 50'. The push mechanism 44 of centering unit 20' operates in the same manner as in the centering unit 20 of FIGS. 4-9, and the same numerical designations have been used for the common parts and components.

Where the resistance fluid is a gas, the gas pressure control may comprise a manual throttle valve (not shown) in conduit 73, in combination with a pressure gauge 104 to indicate the gas pressure. Alternatively, as shown in FIG. 11, a pressure regulator 84 may be used in conduit 73 for maintaining a selected centering system pressure. A selector knob 85 may be provided to permit varying the pressure settings of the regulator by hand. By varying the gas pressure in centering chamber 70 by adjustments to pressure regulator 84, the break-away resistance and the centering return force produced by the centering unit 20' can be increased or decreased as desired. The pressure gauge 104 and the regular 84 may be mounted on a control panel 89, preferably located at or near the driver's station of the vehicle. The range of pressures available should be selected so that break-away resistance can be varied from relatively low at low speeds to relatively high at high speeds.

Pressure regulator 84 is connected to a compressed gas source 101, such as an onboard air tank or compressor, via a conduit 103 containing a three-way valve 105 operated by a solenoid 106. The gas pressure in chamber 70 is indicated by the pressure gauge 104, which is connected to pressure regular 84 by a conduit 107. The gas is preferably air, although nitrogen or other non-flammable gases may be used. The electrical components of the control system are activated by an on-off switch 113, which is connected to an electrical bus 115 by a line 117 containing a circuit breaker 119. It is to be understood that the components described are connected together by appropriately sized fluid conduits and electrical wires and that these conduits and wires are represented by the lines interconnecting the components as shown in FIG. 11.

As it is best to deactivate centering unit 20' in the event of a failure of the power steering system, a switch 121 for interrupting electrical power to the solenoid valve 105 may be provided for vehicles with power steering systems. Switch 121 is mounted on a pressure sensor 123 located in a hydraulic line 125 in fluid communication with the outlet of the vehicle's power steering pump (not shown). A loss of pressure at the pump outlet causes switch 121 to open, thereby causing gas supply valve 105 to close off pressure source 101 and dump air from centering chamber 70 and lines 73 and 103 to ambient via an exhaust line 108 in the absence of electrical power to solenoid 106. Pressure regulator 84 is designed to permit such reverse flow from chamber 70 and line 73. Alternately, valve 105 and line 108 may be placed in line 73 instead of line 103.

As an alternative to manual adjustment, the output pressure of regulator 84 may be adjusted by replacing selector knob 85 with a reversible electric motor or solenoid controlled by an on-board computer 80, which comprises a microprocessor 90, an encoder 91 and a decoder 92. Encoder 91 converts to digital signals an analog signal 96 input from a pressure sensor 95 in the gas supply conduit 73, an analog signal 94 input from a vehicle speed sensor 93, and an analog signal 81 input from a position sensor within regulator 84. Decoder 92 converts digital control signals generated by microprocessor 90 to an analog signal 83 for controlling the reversible electric motor or solenoid to make adjustments in the output pressure provided by regulator 84. The gas pressure in gas chamber 70 and the resulting resistance and centering forces are thereby made automatically responsive to the speed of the vehicle to provide a "speed sensitive" centering force to the vehicle's steering system. It may be desirable in some applications that the resistance to turning movements away from the center position be increased automatically as the speed of the vehicle increases because the effects of small off-center movements in response to spurious steering inputs increase dramatically with vehicle speed.

Figure 12:
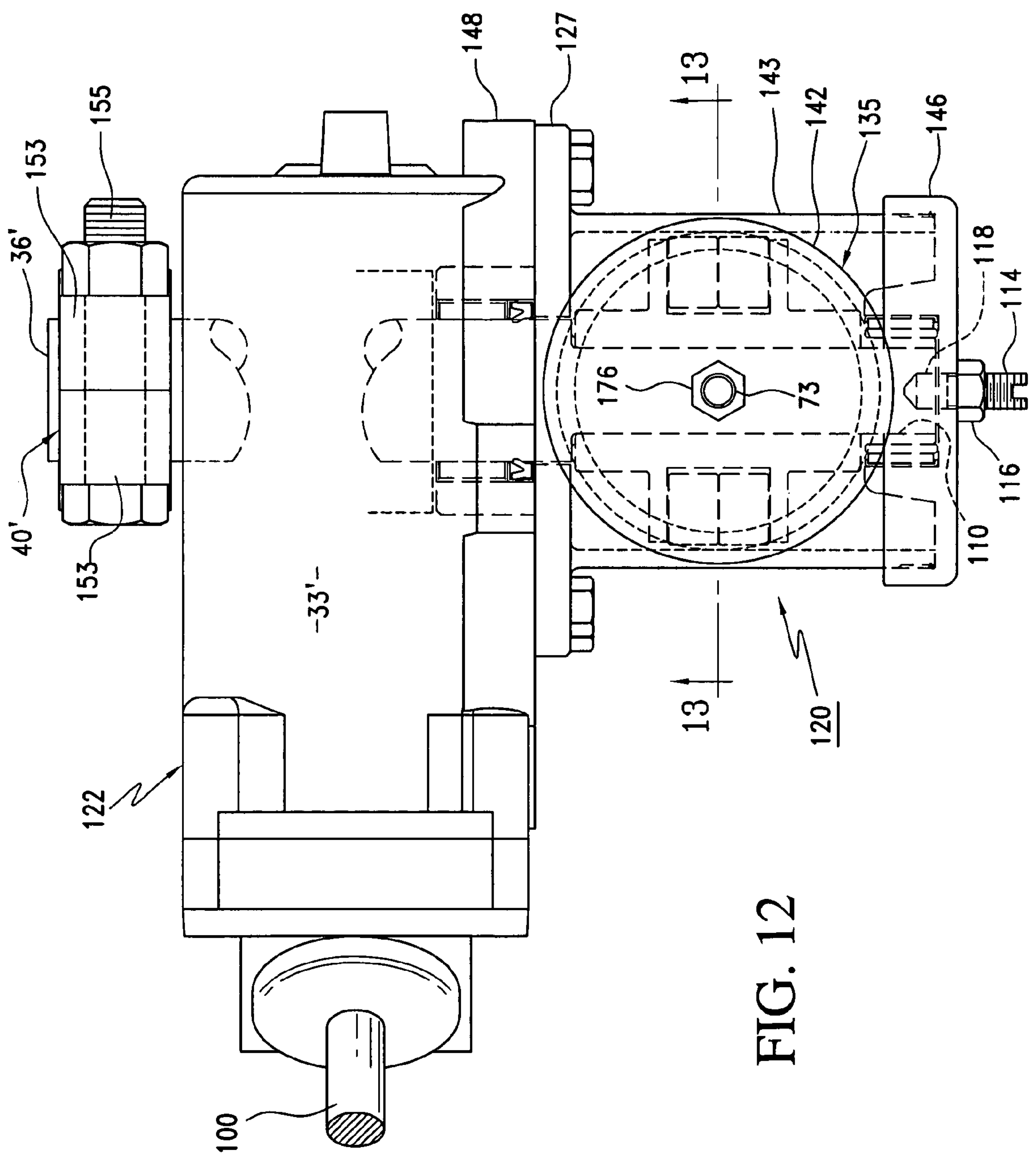
FIG. 12 is a top plan view of another modification of the centering assembly of the invention as installed on the housing of a steering gear assembly and connected directly to a modified steering gear shaft.
Figure 15:
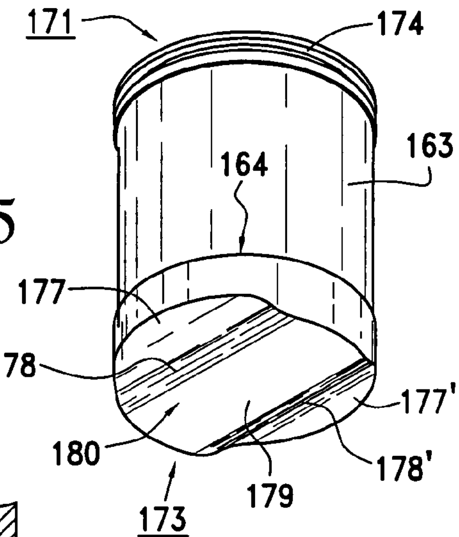
FIG. 15 is a perspective view of the bottom and side exterior surfaces of the cylinder component of FIG. 13.
Figure 16:
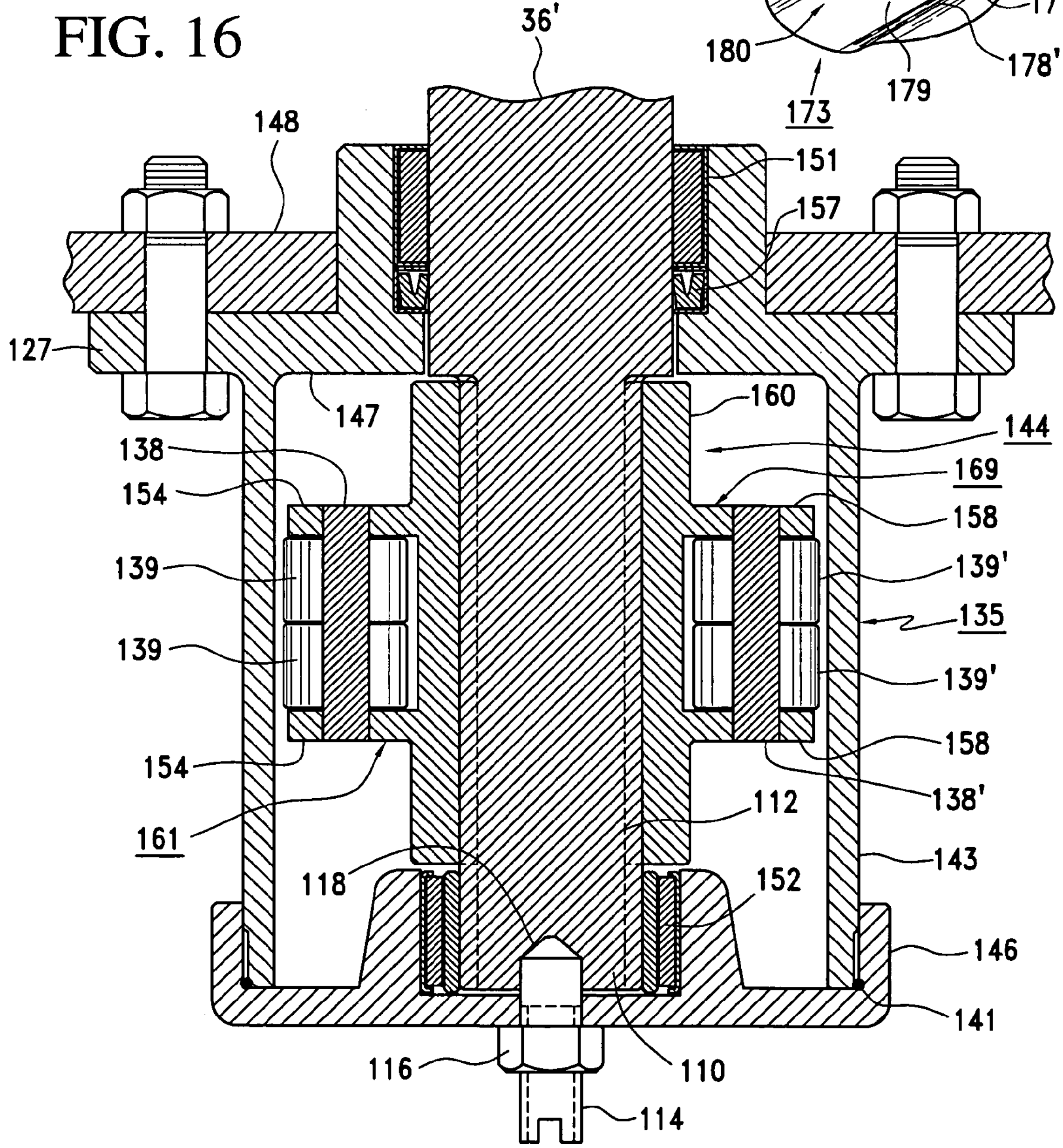
FIG. 16 is a plan sectional view of the modified centering unit of FIG. 12 in section taken along line 16-16 of FIG. 13; and, FIG. 17 is a front elevational view of the modified centering assembly of FIG. 12 showing a Pitman arm connection between the modified steering shaft and a drag link component of the vehicle steering system.
Figure 17:
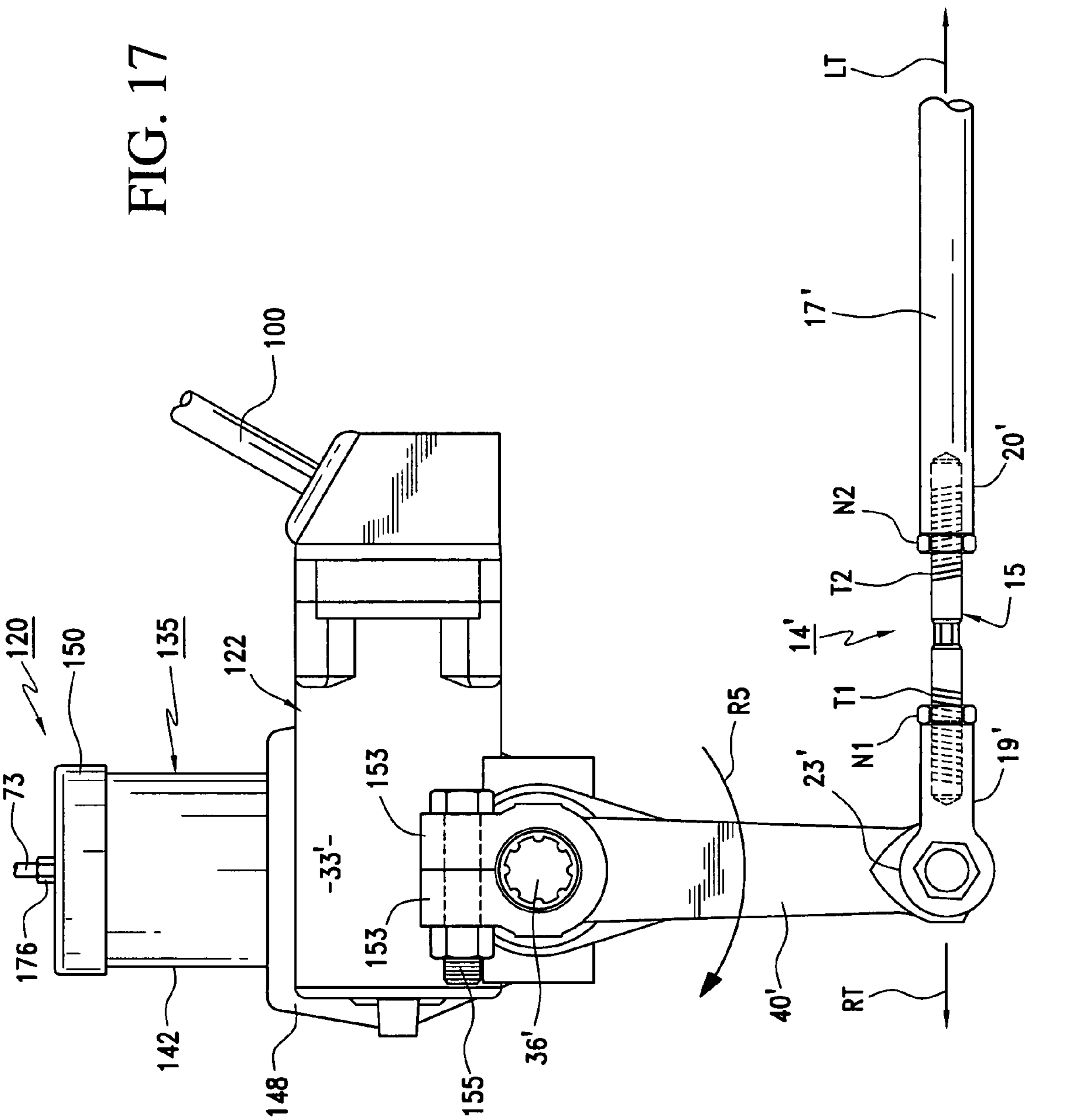

A modified centering unit 120 of the invention may be mounted directly on the housing 122 of a steering gear 33' as shown in FIGS. 12-17. Within the housing 122 are the usual steering gears (not shown) that are rotated by a steering column 100 to cause reciprocating pivotal movements of a steering shaft 36' and a Pitman arm 40'. Pitman arm 40' is secured to a distal end portion of steering shaft 36' for rotation therewith by a clamping portion having opposing ears 153, 153 clamped around the distal end portion by a bolt 155 (FIG. 12). As shown in FIG. 17, Pitman arm 40' is connected to a drag link 17' by a trim mechanism 14' for trimming and steering the steerable wheel(s) of the vehicle in the same manner as described above for the trim mechanism 14 shown in FIG. 4.

Trim mechanisms 14 and 14' have the same components and these components therefore have the same numerical designations.

Figure 13:
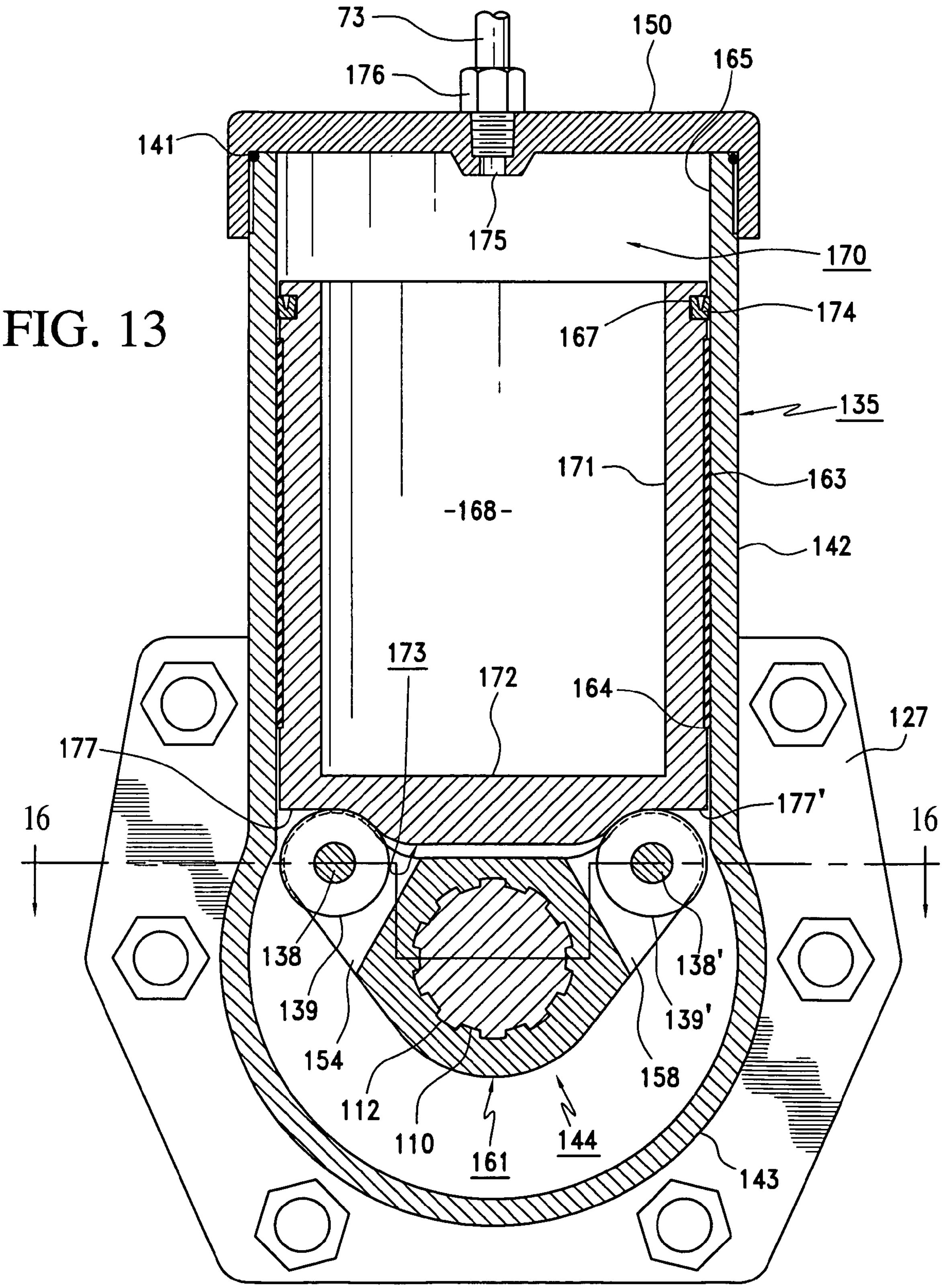
FIG. 13 is an enlarged elevational view of the modified centering unit of FIG. 12 in section taken along lines 13-13 of FIG. 12.
Figure 14:
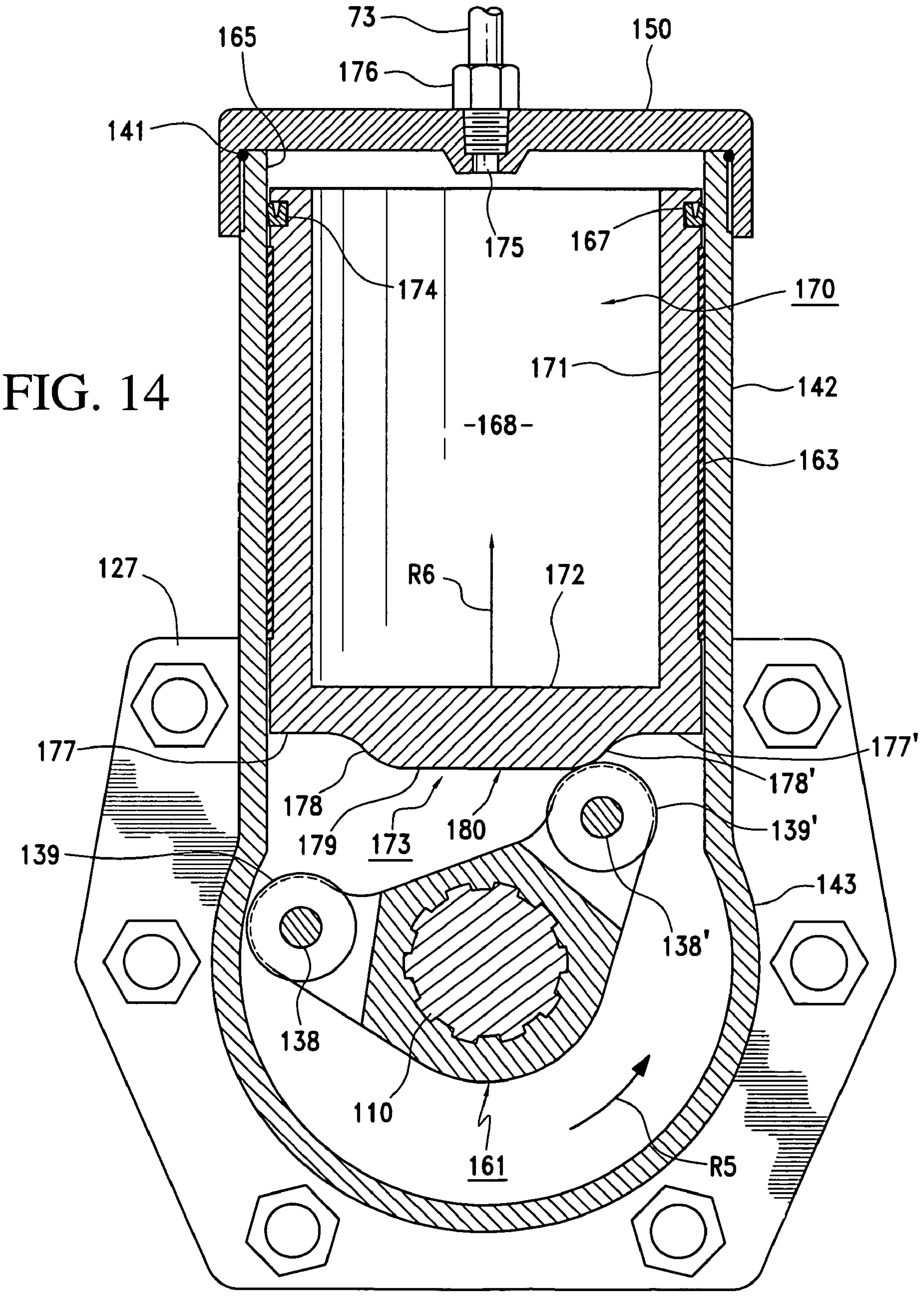
FIG. 14 is an enlarged elevational view of the modified centering unit of FIG. 12 in section similar to FIG. 13, but showing the components thereof in a moved position corresponding to a vehicle turning movement.

The specific structural arrangement of the components preferably incorporated in or attached directly to the modified centering unit 120 is shown in FIGS. 13, 14 and 16. The housing 135 of centering unit 120 is preferably made of cast metal, and comprises a cylindrical upper section 142 and a barrel-like lower section 143 having a distal end cap 146 threaded thereon and sealed by an O-ring 141. As may be seen best in FIGS. 12 and 13, the housing 135 is cast with a proximate flange 127 for securing the housing to a sidewall 148 of the steering gear housing 122 with six (6) bolts.

As may be seen best in FIG. 16, the steering shaft 36' includes an extension 110 integral with the shaft end opposite to the projecting distal end on which Pitman arm 40' is mounted. In this embodiment, shaft extension 110 serves as the centering shaft. A base sleeve 160 of the push mechanism 144 is mounted on centering shaft 110 and a plurality of splines 112 provide positive engagement between sleeve 160 and shaft 110 so that the sleeve will pivot together with steering shaft 36' and Pitman arm 40'. An axle pin 114 with a cone-like end is threaded into a central portion of the disk-like housing cap 146 and secured in place by a lock nut 116. Axle pin 114 engages a conformingly shaped bore 118 in the distal end of shaft 110 to provide precision lateral support and stability for shaft rotation and axial pressure that may be adjusted to eliminate any undesirable slack. The wall of bore 118 and the surface of the corresponding end portion of pin 114 are smooth so as not to interfere with shaft rotation.

A hollow cylinder 171 is arranged for reciprocation within a sealed centering chamber 170 that is closed by a cap 150 threaded onto a cylindrical upper housing section 142. Reciprocation of cylinder 171 is guided by a bushing 163 of low friction material, such as Teflon, that is pressed within a circumferential recess 164 in the outer cylindrical surface of cylinder 171. Cylinder 171 is biased downward firmly against push mechanism 144 by the pressure of a fluid introduced into sealed chamber 170 through the conduit 73 of FIG. 11, which is connected to an aperture 175 in cap 150 by a fitting 176.

In this embodiment, the centering chamber 170 is formed by the upper portion of a housing bore 165 and the cavity 168 of hollow cylinder 171. To ensure that chamber 170 is sealed to prevent leakage of the pressurized fluid, which is preferably a gas, an O-ring seal 141 is provided between cap 150 and the outer top edge of upper housing section 142, and a U-cup seal 174 is provided in a groove 167 extending around the circumference of the outer upper edge portion of cylinder 171.

Thus, the resilient means of this last embodiment includes a pressurized gas in the sealed centering chamber 170, instead of the resilient compression spring 62 of FIGS. 4-9. Chamber 170 is sealed to retain gas pressure by providing the gas cylinder 171 with a closed lower end 172 and the U-cup circumferential gas seal 174, and by providing the O-ring cap seal 141. A pressurized gas, such as air or nitrogen is supplied to chamber 170 via the gas conduit 73 connected to top cap 150 by the fitting 176 threaded within the aperture 175. Conduit 73 is connected to the same pressurized gas supply and control system as conduit 73 in FIG. 11.

The push mechanism 144 of centering unit 120 operates in the same manner as push mechanism 44 in the centering unit 20 of FIGS. 4-9 and in the centering unit 20' of FIGS. 10-11, but the parts and components have different shapes and different numerical designations. Thus, the reciprocation of cylinder 171 is driven against the force of fluid pressure in chamber 170 by the push mechanism 144 that has a plurality of roller bearings mounted for rotation on the support arms of two opposing support members 161 and 169. The support members 161 and 169 are affixed to the steering shaft extension 110, i.e., the centering shaft, for pivotable movement therewith as steering shaft 36' pivots the Pitman arm 40' and causes linear reciprocation of the drag link 17' via the connection provided by a trimming linkage 14'.

As may be seen best in FIG. 16, the support members 161 and 169 comprise two pairs of opposing support arms 154, 154 and 158,158, arms 154,154 carrying therebetween a pin 138 on which are rotatably mounted a pair of roller bearings 139,139, and arms 158,158 carrying therebetween a pin 138' on which are rotatably mounted a pair of roller bearings 139',139'. In the absence of any turning movement, the fluid pressure against cylinder end wall 172 causes roller pairs 139,139 and 139',139' to be continuously and firmly pressed against respective parallel edge surfaces 177 and 177' of a bearing surface or face, generally designated 173, formed as the outer surface of cylinder end wall 172 as shown in FIGS. 13, 14 and 15. Surfaces 177 and 177' are preferably substantially flat in a radial plane that preferably is substantially perpendicular to the central axis of cylindrical cylinder 171. The resulting at rest pressing force on roller pairs 139,139 and 139',139' prevents any mechanical slack in the centering system.

As shown best in FIGS. 14 and 15, the bearing face 173 also includes a raised elongated and centrally located boss 180 in the form of a ridge having a central surface 179 bounded on opposite sides by parallel sloped surfaces 178 and 178', each having a wave-like radial contour providing a smooth transition between central surface 179 and the corresponding edge surfaces 177 and 177'. Like surfaces 177 and 177', central surface 179 is also preferably substantial flat in a radial plane that preferably is substantially perpendicular to the central axis of cylinder 171. For a given level of fluid pressure in chamber 170, the presence and radial contour of boss 180 increases the amount of on-center holding force (turning resistance) that must be overcome by a steering force to initiate a steer wheel turning movement, as compared to an entirely flat bearing surface without a boss such as surface 73 shown in FIG. 10.

In addition, the radial contour selected for bearing surface 173 will control the changes in the resistance and return forces transmitted to the steering system via centering shaft 110 as the bearing roller pairs 139,139 and 139',139' traverse along the changing slope of this contour from respective edge surfaces 177 and 177' to central surface 179. By "resistance force" is meant the holding force transmitted by the centering unit for resisting away from center movements of the steering system, and by "return force" is meant the resilient force transmitted by the centering unit for causing the steering system to return to its centered position upon removal a steering force that caused an away from center movement.

Preferably, the resistance force is at its maximum level when the bearing rollers are in their rest positions against a conformingly shaped portion of surfaces 178 and 178' as shown in FIG. 13, and the return force is at its maximum level when either of the bearing roller pairs is just leaving its rest position. Where there is positive steer wheel caster, the resistance and return forces are preferably at their minimum level when either pair of the bearing rollers is in a position at or near the crest of its respective sloped surface 178 or 178' as shown in FIG. 14. Preferably, the maximum range of pivotal movement of the Pitman arm relative to the contours of sloped surfaces 178 and 178' is such that the roller pairs 139,139 and 139'139' will never go over the crests of these surfaces and onto the flat surface 179 to ensure that the rollers stay within the opposite raceways formed respectively by the contiguous surfaces 177 and 178 and the contiguous surfaces 177' and 178'.

Referring now to FIGS. 14 and 17, as centering shaft 110 and Pitman arm 40' tend to pivot in the direction of arrow R5, the push mechanism 144 tends to pivot in the same direction causing the bearing rollers 139',139' to press harder than bearing rollers 139,139 against the bearing surface 173 along the bottom wall 172 of cylinder 171. When the pressing force provided by rollers 139',139' is sufficient to overcome the resistance force provided by the fluid pressure in centering chamber 170, cylinder 171 travels through a compressive movement in the direction of arrow R6, and push mechanism 144, centering shaft 110, steering shaft 36' and Pitman arm 40' pivot together in the direction of arrow R5. The arrows R5 and R6 in FIG. 14 and arrow R5 in FIG. 17 illustrate a turning of the front steer wheels of a motor vehicle toward the right side of the vehicle for making a sharp right turn, as illustrated by the arrow RT in FIG. 17. Similarly, for a left turn of the vehicle as illustrated by the arrow LT, the pivotal movement of push mechanism 144, centering shaft 110, steering shaft 36' and Pitman arm 40' will be in the direction opposite to arrow R5 in FIGS. 14 and 17, such that roller bearings 139,139 will provide the necessary pressing force for causing cylinder 171 to have a compressive movement in the direction R6.

The centered steering position to be maintained by the centering unit 120 described above may be changed as follows by the trim linkage 14' shown in FIG. 17. The length of linkage 14' is changed by loosening the lock nuts N1 and N2 and then rotating the trim rod 15 in the appropriate direction either to pull the sleeve 19' of articulated joint 23' closer to the sleeve 20' at the end of drag link 17' if the centered position of the steering system needs adjustment toward the right side of the vehicle, or to push the sleeves 19' and 20' further apart if the centered position needs adjustment toward the left side of the vehicle. The threads T1 and T2 and the lock nuts N1 and N2 shown in FIG. 17 are the same as those shown in FIG. 4 and therefore the same numerical designations are used.

In FIG. 17, the trim rod 15 is shown approximately in its center position wherein the longitudinal axis of lever 40' is substantially vertical when the steering system is in its on-center position. Rotation of the trim rod 15 preferably can change the rest position of drag link 17' by a maximum adjustment that is preferably in the range of about one inch to about two inches. However, the average trim adjustments needed should be on the order of a few one-thousandths of an inch. The tolerance for slack between drag link 17' and cylinder 171 due to the interconnecting joints and other connecting elements therebetween is preferably held to no more than one-ten-thousandth of an inch.

The centering chamber 70 of centering unit 20' and the centering chamber 170 of center unit 120 may be pressurized by air or liquid to a pressure of, for example, 130 psig to provide a corresponding turning resistance. If the internal working area of bottom wall 72 of cylinder 71 or of bottom wall 172 of cylinder 171 is 3.5 square inches, a centering chamber pressure of 200-250 psig will provide a linear resistance force of about 500-550 pounds, as measured at the drag link 17 or 17' for opposing off-center movement of Pitman arm 40 or 40', respectively. Since many conventional steering system geometries provide a linear resistance force of about 15 to 20 pounds as measured at the drag link, the present invention may be used to increase the resistance and re-centering forces of these steering systems by a multiple of about 5 to about 30 or more, preferably about 10 to about 25. A resistance force of 500 pounds or more at the drag link is particularly effective in eliminating the adverse effects of crosswinds on large vehicles.

It is also important to recognize that the centering unit of the present invention engages the vehicle steering system at a location between the steer wheels and the reduction steering gears in box 33 or box 33'. As a result, spurious inputs from the steering wheel column and/or from the power steering unit are absorbed by the centering unit 20, 20' or 120 before these inputs can reach the steer wheels. Likewise, spurious forces transmitted from the roadway are immediately absorbed in the centering unit, rather than being transmitted through the entire steering assembly before encountering any stabilizing resistance from the steering wheel. As a result, the centering assembly of the invention protects the interior components of the steering assembly from the wear caused by repeated oscillations between states of tension and compression.

A number of modifications and alterations are possible without departing from the scope of the present invention. For example, instead of having the mechanically adjustable trim linkage 14 or 14', there may be used a remotely adjustable trim valve assembly as described in a number of my prior patents that are identified below. Another possible modification is that the important trimming feature of the invention may be achieved through remotely operable drive means connected to trim rod 15. For example, movement of the trim rod 15 relative to sleeves 19 and 20 or sleeves 19' and 20' may be accomplished by controllably rotating rod 15 with a small reversible electric motor mounted on a platform carried by the drag link, similar to the way connecting plate 24 is carried by drag link 17. However, the mechanical trimming arrangement shown in FIGS. 4 and 17 of the drawings is preferred for its precision, simplicity and ease of installation on a wide variety of vehicles.

The invention may be used with various steering and/or tie rod arrangements and with steering systems that do not require a steering rod or a tie rod, e.g., those with only one steerable member such as the rudder of a ship or an airplane. The variable resistance and return force section of the invention can be used alone as a centering unit without the trimming unit disclosed herein. On the other hand, the trimming unit of the invention may be used with centering mechanisms of the prior art. Thus, the trimming unit of the present invention can be combined with centering devices of known types to provide adjustment of the center position for compatibility with steering system geometry.

Also, one or more of the resistance components or trimming components of the present invention may be combined with one or more such components as disclosed in my U.S. Pat. No. 4,410,193, U.S. Pat. No. 4,418,931, U.S. Pat. No. 4,534,577, U.S. Pat. No. 5,527,053, U.S. Pat. No. 5,536,028, U.S. Pat. No. 6,003,887, U.S. Pat. No. 6,065,561, U.S. Pat. No. 6,267,395, U.S. Pat. No. 6,422,582, U.S. Pat. No. 6,520,519, U.S. Pat. No. 6,520,520, U.S. Pat. No. 6,530,585, U.S. Pat. No. 6,817,620 and U.S. Pat. No. 6,994,361, in my Patent Publication No. 2005-0167939-A1, and in my patent applications Ser. No. 10/953,965, Ser. No. 10/871,672, and Ser. No. 11/261,986. The entire contents of each of these patents, publications and applications are expressly incorporated herein by reference. In addition, a number of other modifications to both the variable resistance components and to the trimming components specifically disclosed herein are possible without departing from the scope of the invention as defined by the claims set forth below.

What is claimed is:

1. An apparatus for positioning at least one steerable member connected to a steering shaft for movement to either side of a selected center position in response to rotational reciprocation of the steering shaft to either side of a centering position, said apparatus comprising resistance means for providing a holding force resisting steering forces tending to move said steerable member to either side of said center position, said resistance means comprising:

a centering shaft and means for connecting said centering shaft to the steering shaft for rotational reciprocation around a centering shaft axis, a rotational position of said centering shaft defining a neutral position corresponding to said selected center position;

a hollow centering cylinder and stationary housing means for cooperating with said cylinder so that a cavity within said cylinder forms at least part of a centering chamber, said centering cylinder being arranged to reciprocate between a rest position and an active position for compressing resilient means in said centering chamber for exerting a resilient force against said cylinder; and, actuating means for causing compressive movement of said centering cylinder away from said rest position in response to rotational movement of said centering shaft around said shaft axis to either side of said neutral position, said actuating means comprising first engaging means for engaging an outer surface of an end wall of said centering cylinder so that rotation of said centering shaft away from said neutral position toward one side causes compressive movement of said centering cylinder, and second engaging means for engaging said outer surface of said centering cylinder end wall so that rotation of said centering shaft away from said neutral position toward the other side causes compressive movement of said centering cylinder;

wherein the exertion of said resilient force against said centering cylinder causes said centering cylinder and said first and second engaging means to resist rotation of said centering shaft away from its neutral position, and thereby provides said holding force by opposing movement of said steerable member toward either side of said selected center position and provides a return force continuously biasing said steerable member toward said selected center position during movement of said steerable member to either side of said selected center position, the rest position of centering cylinder corresponding to the neutral position of said centering shaft.

2. An apparatus according to claim 1, wherein said first engaging means comprises a push arm and said second engaging means comprises another push arm, wherein each of said push arms has a proximate end rigidly connected to said centering shaft, and wherein each of said push arms has a distal end for engaging the outer surface of said centering cylinder end wall.

3. An apparatus according to claim 2, wherein each of said distal ends comprises a corresponding bearing means.

4. An apparatus according to claim 1, further comprising guide means for guiding reciprocation of said centering cylinder in a bore of said housing means.

5. An apparatus according to claim 4, wherein said guide means comprises a sleeve of low friction material carried in a peripheral recess in an outer surface of a sidewall of said centering cylinder and arranged to engage an opposing surface of said bore.

6. An apparatus according to claim 1 further comprising trim means for changing the centering position of said steering shaft to vary the selected center position of said steerable member.

7. An apparatus according to claim 6, wherein said steering shaft is connected to a steering system component movable with said steerable member, wherein said trim means comprises a linkage assembly connected between said steering system component and a centering lever connected to said centering shaft, the length of said linkage assembly being adjustable to change the centering position of said steering shaft; and wherein said adjustable linkage assembly comprises a trim rod having oppositely canted threads at opposite ends thereof that are engaged by correspondingly canted threads in respective first and second sleeve portions, said first sleeve portion being connected to said steering system component, and said second sleeve portion being connected to said centering lever so that rotation of said trim rod in one direction pulls said sleeves together and rotation of said trim rod in another direction pushes said sleeves apart.

8. An apparatus according to claim 7, wherein said steering system component is connected to a steering lever carried by said steering shaft such that rotational reciprocation of the steering shaft causes pivotal reciprocation of both said steering lever and said centering lever.

9. An apparatus according to claim 1, wherein said first engaging means comprises a first pair of push arms and said second engaging means comprises a second pair of push arms, wherein each of said push arms has a proximate end rigidly connected to said centering shaft, and wherein each of said push arms has a distal end, the distal ends of said first pair and the distal ends of said second pair supporting therebetween a contact member for engaging the outer surface of said centering cylinder end wall.

10. An apparatus according to claim 1 for a vehicle having a power steering unit for providing steering power to said steerable member, said apparatus further comprising means for preventing said resilient force in the absence of steering power from said power steering unit.

11. An apparatus according to claim 1, wherein said reciprocating centering cylinder cooperates with said housing means to form a sealed centering chamber, said centering cylinder being arranged to reciprocate between said rest position and said active position for compressing a fluid within said sealed centering chamber; and wherein said apparatus further comprises fluid means for providing a pressurized fluid in said sealed centering chamber, said resilient means comprising said pressurized fluid, and said fluid means comprising a source of said pressurized fluid and conduit means for providing a flow of said pressurized fluid from said source to said sealed centering chamber.

12. An apparatus according to claim 11, wherein said fluid means further comprises control means for controllably varying the pressure of said fluid in said sealed centering chamber so as to vary the holding force provided by said centering cylinder.

13. An apparatus according to claim 12 for positioning a steerable wheel of a vehicle, wherein said control means comprises sensor means for sensing a speed of said vehicle, and means for adjusting the amount of said fluid pressure in response to said vehicle speed.

14. An apparatus according to claim 11, wherein each of said engaging means engage a corresponding bearing surface of said centering cylinder with an amount of contact pressure dependant upon the fluid pressure in said sealed centering chamber, and wherein said fluid means includes adjusting means for remotely adjusting said fluid pressure to change the amount of said resilient force and thereby change said holding force.

15. An apparatus according to claim 1, wherein said resilient means comprises a resilient spring arranged in said centering chamber so that said resilient force is a spring force is applied against a wall of said centering cylinder and reciprocation of said centering cylinder between said rest position and said active position compresses said spring.

16. An apparatus according to claim 1, wherein said centering shaft is formed as an extension of said steering shaft such that said centering shaft axis substantially coincides with a rotational axis of said steering shaft.

17. An apparatus according to claim 6 further comprising trim means for changing the selected center position of said steerable member, wherein said trim means comprises a linkage assembly connected between said steering shaft and another steering system component movable with said steerable member, the length of said linkage assembly being adjustable to change the center position of said steerable member; and wherein said linkage assembly comprises a trim rod having oppositely canted threads at opposite ends thereof that are engaged by correspondingly canted threads in respective first and second sleeve portions, said first sleeve portion being connected to said steering system component and said second sleeve portion being connected to a steering lever carried by said steering shaft so that rotation of said trim rod in one direction pulls said sleeves together and rotation of said trim rod in another direction pushes said sleeves apart.

18. An apparatus according to claim 1, wherein said first engaging means comprises a first push arm and said second engaging means comprises a second push arm, wherein said push arms have a proximate end rigidly connected to said centering shaft and a distal end supporting respective first and second bearing means for engaging an outer surface of an end wall of said centering cylinder, and wherein said outer surface has a radial contour for engagement by each of said bearing means to provide an amount of said holding force greater than an amount of holding force that would be provided if said bearing means instead engaged a flat outer surface.

19. An apparatus according to claim 18, wherein said first bearing means is arranged to move along said radial contour as said centering shaft rotates toward said one side of said neutral position, wherein said second bearing means is arranged to move along said radial contour as said centering shaft rotates toward said other side of said neutral position, and wherein said radial contour has a slope that changes from opposite edge portions to a central portion of said outer surface to cause corresponding changes in said holding and return forces as said bearing means move along said radial contour.

20. An apparatus for positioning at least one steerable member connected to a steering shaft for movement to either side of a selected center position in response to rotational reciprocation of the steering shaft to either side of a centering position, said apparatus comprising resistance means for providing a holding force resisting steering forces tending to move said steerable member to either side of said center position, said resistance means comprising:

a centering shaft and means for connecting said centering shaft to the steering shaft for rotational reciprocation around a centering shaft axis, a rotational position of said centering shaft defining a neutral position corresponding to said selected center position;

a hollow centering cylinder and stationary housing means for cooperating with said cylinder so that a cavity within said cylinder forms at least part of a centering chamber, said centering cylinder being arranged to reciprocate between a rest position and an active position for compressing resilient means in said centering chamber for exerting a resilient force against said cylinder; and, actuating means for causing compressive movement of said centering cylinder away from said rest position in response to rotational movement of said centering shaft around said shaft axis to either side of said neutral position, said actuating means comprising first engaging means for engaging said centering cylinder so that rotation of said centering shaft away from said neutral position toward one side causes compressive movement of said centering cylinder, and second engaging means for engaging said centering cylinder so that rotation of said centering shaft away from said neutral position toward the other side causes compressive movement of said centering cylinder;

wherein said first engaging means comprises a first push arm and said second engaging means comprises a second push arm, wherein said push arms have a proximate end rigidly connected to said centering shaft and a distal end supporting respective first and second bearing means for engaging an outer surface of an end wall of said centering cylinder, wherein said outer surface has a radial contour for engagement by each of said bearing means to provide an amount of said holding force greater than an amount of holding force that would be provided if said bearing means instead engaged a flat outer surface, and wherein the exertion of said resilient force against said centering cylinder causes said centering cylinder and said first and second engaging means to resist rotation of said centering shaft away from its neutral position, and thereby provides said holding force by opposing movement of said steerable member toward either side of said selected center position and provides a return force continuously biasing said steerable member toward said selected center position during movement of said steerable member to either side of said selected center position, the rest position of centering cylinder corresponding to the neutral position of said centering shaft.

21. An apparatus for positioning at least one steerable member connected to a steering shaft for movement to either side of a selected center position in response to rotational reciprocation of the steering shaft to either side of a centering position, said apparatus comprising resistance means for providing a holding force resisting steering forces tending to move said steerable member to either side of said center position, said resistance means comprising:

a centering shaft and means for connecting said centering shaft to the steering shaft for rotational reciprocation around a centering shaft axis, a rotational position of said centering shaft defining a neutral position corresponding to said selected center position;

a hollow centering cylinder and stationary housing means for cooperating with said cylinder so that a cavity within said cylinder forms at least part of a centering chamber, said centering cylinder being arranged to reciprocate between a rest position and an active position for compressing resilient means in said centering chamber for exerting a resilient force against said cylinder; and, actuating means for causing compressive movement of said centering cylinder away from said rest position in response to rotational movement of said centering shaft around said shaft axis to either side of said neutral position, said actuating means comprising first engaging means for engaging said centering cylinder so that rotation of said centering shaft away from said neutral position toward one side causes compressive movement of said centering cylinder, and second engaging means for engaging said centering cylinder so that rotation of said centering shaft away from said neutral position toward the other side causes compressive movement of said centering cylinder;

wherein said centering shaft is formed as an extension of said steering shaft such that said centering shaft axis substantially coincides with a rotational axis of said steering shaft, and wherein the exertion of said resilient force against said centering cylinder causes said centering cylinder and said first and second engaging means to resist rotation of said centering shaft away from its neutral position, and thereby provides said holding force by opposing movement of said steerable member toward either side of said selected center position and provides a return force continuously biasing said steerable member toward said selected center position during movement of said steerable member to either side of said selected center position, the rest position of centering cylinder corresponding to the neutral position of said centering shaft.

* * * * *